(12) United States Patent
Balasubramanian et al.

(10) Patent No.: US 12,150,057 B2
(45) Date of Patent: Nov. 19, 2024

(54) ITERATIVE WAKE UP SIGNALING FOR POWER SAVING

(71) Applicant: QUALCOMM Incorporated, San Diego, CA (US)

(72) Inventors: Anantharaman Balasubramanian, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/706,188

(22) Filed: Mar. 28, 2022

(65) Prior Publication Data
US 2023/0309019 A1    Sep. 28, 2023

(51) Int. Cl.
*H04W 52/02* (2009.01)
*H04W 4/029* (2018.01)

(52) U.S. Cl.
CPC ....... *H04W 52/0229* (2013.01); *H04W 4/029* (2018.02); *H04W 52/0235* (2013.01); *H04W 52/0274* (2013.01)

(58) Field of Classification Search
CPC ............ H04W 52/0229; H04W 4/029; H04W 52/0235; H04W 52/0274; H04W 4/02; H04W 4/027; H04W 4/40; H04W 4/44; H04W 4/46; Y02D 30/70
See application file for complete search history.

(56) References Cited

U.S. PATENT DOCUMENTS

| | | | | |
|---|---|---|---|---|
| 2017/0156034 | A1* | 6/2017 | Smith | H04W 4/026 |
| 2020/0125355 | A1* | 4/2020 | Aust | H04W 4/44 |
| 2020/0175865 | A1* | 6/2020 | Han | H04B 1/385 |
| 2020/0404587 | A1* | 12/2020 | Balasubramanian | H04W 4/70 |
| 2022/0394213 | A1* | 12/2022 | De Steuben | H04N 7/188 |
| 2022/0400532 | A1* | 12/2022 | Kalkunte | H04W 4/029 |
| 2023/0377460 | A1* | 11/2023 | Sivanesan | G08G 1/143 |

* cited by examiner

*Primary Examiner* — Dinh Nguyen
(74) *Attorney, Agent, or Firm* — Holland & Hart LLP

(57) ABSTRACT

Methods, systems, and devices for wireless communications are described. A vehicle user equipment (VUE) may transmit an iterative wake-up signal (WUS) to a first roadside unit (RSU). The iterative WUS may include location information associated with an expected path of the VUE and may instruct the first RSU to transmit one or more other WUSs to at least a second RSU that supports communication along a portion of the expected path of the VUE. In some cases, the first RSU may transmit an iterative WUS to the second RSU, the second RSU may transmit an iterative WUS to a third RSU, and so on until the final RSU along the expected path is woken up with a normative (e.g., non-iterative) WUS. An RSU may provide safety information to the VUE, and after the VUE leaves a service area associated with an RSU, the RSU may activate a low power mode.

30 Claims, 15 Drawing Sheets

ITERATIVE WAKE UP SIGNALING FOR POWER SAVING

FIELD OF TECHNOLOGY

The following relates to wireless communications, including iterative wake up signaling for power saving.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support iterative wake up signaling for power saving. For example, the described techniques provide iterative wake up signals (WUSs), which may be used by one or more wireless devices to trigger wake up of one or more other wireless devices along a path of a user equipment (UE), such as a vehicle UE (VUE). For example, a VUE may transmit an iterative WUS to a network entity, such as a road side unit (RSU), and the RSU may activate one or more components for communicating with the VUE. The VUE may transmit location information associated with the VUE, such as an origin location, a destination location, or both, associated with an expected travel path of the VUE. The location information may include one or more waypoints or a map associated with the expected travel path of the VUE, and the expected travel path may be the trajectory of the VUE along a path the VUE is expected to travel. The iterative WUS may include the location information of the VUE and the RSU (or other network entity) may, after receiving the iterative WUS from the VUE, transmit another WUS (e.g., a second WUS, a normative WUS, or other WUS) to a second RSU (e.g., a second network entity) that is located along or supports communication along a portion of the expected path of the VUE. The WUS from the RSU to the second RSU may trigger the second RSU to activate one or more components (e.g., communication components or sensor components) so that the one or more components are activated when the VUE is in the vicinity of or located along the expected path that is supported by the second RSU. This may enable the second RSU to effectively communicate with the VUE when the VUE is in a communication coverage area of the second RSU without a VUE having to send a WUS to the second RSU upon entering the communication coverage area of the second RSU. Such techniques may reduce latency and overhead associated with WUS transmission from a VUE to one or more RSUs. The techniques may also enable an RSU to enter power save mode after the VUE exits the communication coverage area for the RSU, which may improve power savings at the RSU.

A method for wireless communications at a VUE is described. The method may include transmitting an iterative WUS to a first wireless device, the iterative WUS including location information associated with an expected path of the VUE, where the iterative WUS instructs the first wireless device to transmit one or more other WUSs to at least a second wireless device that supports communication along a portion of the expected path of the VUE and communicating, by the VUE located within the portion of the expected path, with the second wireless device based on the iterative WUS.

An apparatus for wireless communications at a VUE is described. The apparatus may include a processor, memory coupled with the processor, and one or more instructions stored in the memory. The one or more instructions may be executable by the processor to cause the apparatus to, based at least in part on the one or more instructions, transmit an iterative WUS to a first wireless device, the iterative WUS including location information associated with an expected path of the VUE, where the iterative WUS instructs the first wireless device to transmit one or more other WUSs to at least a second wireless device that supports communication along a portion of the expected path of the VUE and communicate, by the VUE located within the portion of the expected path, with the second wireless device based on the iterative WUS.

Another apparatus for wireless communications at a VUE is described. The apparatus may include means for transmitting an iterative WUS to a first wireless device, the iterative WUS including location information associated with an expected path of the VUE, where the iterative WUS instructs the first wireless device to transmit one or more other WUSs to at least a second wireless device that supports communication along a portion of the expected path of the VUE and means for communicating, by the VUE located within the portion of the expected path, with the second wireless device based on the iterative WUS.

A non-transitory computer-readable medium storing code for wireless communications at a VUE is described. The code may include instructions executable by a processor to transmit an iterative WUS to a first wireless device, the iterative WUS including location information associated with an expected path of the VUE, where the iterative WUS instructs the first wireless device to transmit one or more other WUSs to at least a second wireless device that supports communication along a portion of the expected path of the VUE and communicate, by the VUE located within the portion of the expected path, with the second wireless device based on the iterative WUS.

Some examples of the method, apparatuses, and non-transitory computer-readable medium described herein may further include operations, features, means, or instructions for selecting a sequence from a set of sequences available for the iterative WUS, where the iterative WUS includes the sequence.

In some examples of the method, apparatuses, and non-transitory computer-readable medium described herein, transmitting the iterative WUS may include operations, features, means, or instructions for transmitting, within the iterative WUS, a field including one or more bits indicating that the iterative WUS may be iterative.

In some examples of the method, apparatuses, and non-transitory computer-readable medium described herein, transmitting the iterative WUS may include operations, features, means, or instructions for transmitting, within the iterative WUS, a source identifier associated with the VUE.

Some examples of the method, apparatuses, and non-transitory computer-readable medium described herein may further include operations, features, means, or instructions for transmitting, to the first wireless device, a message including a source identifier associated with the VUE.

In some examples of the method, apparatuses, and non-transitory computer-readable medium described herein, transmitting the message may include operations, features, means, or instructions for transmitting a sidelink control information message that includes the source identifier associated with the VUE.

Some examples of the method, apparatuses, and non-transitory computer-readable medium described herein may further include operations, features, means, or instructions for transmitting, to the first wireless device, positioning information of the VUE, the positioning information including a speed of the VUE, a direction of the VUE, or both.

In some examples of the method, apparatuses, and non-transitory computer-readable medium described herein, the location information includes one or more waypoints associated with the expected path of the VUE, a map associated with the expected path of the VUE, source location information associated with the VUE, destination location information associated with the VUE, or any combination thereof.

A method for wireless communications at a first wireless device is described. The method may include receiving, from a VUE, an iterative WUS, the iterative WUS including location information associated with an expected path of the VUE, where the iterative WUS instructs the first wireless device to transmit one or more other WUSs to at least a second wireless device that supports communication along a portion of the expected path of the VUE and transmitting a WUS to the second wireless device based on the location information associated with the expected path of the VUE.

An apparatus for wireless communications at a first wireless device is described. The apparatus may include a processor, memory coupled with the processor, and one or more instructions stored in the memory. The one or more instructions may be executable by the processor to cause the apparatus to, based at least in part on the one or more instructions, receive, from a VUE, an iterative WUS, the iterative WUS including location information associated with an expected path of the VUE, where the iterative WUS instructs the first wireless device to transmit one or more other WUSs to at least a second wireless device that supports communication along a portion of the expected path of the VUE and transmit a WUS to the second wireless device based on the location information associated with the expected path of the VUE.

Another apparatus for wireless communications at a first wireless device is described. The apparatus may include means for receiving, from a VUE, an iterative WUS, the iterative WUS including location information associated with an expected path of the VUE, where the iterative WUS instructs the first wireless device to transmit one or more other WUSs to at least a second wireless device that supports communication along a portion of the expected path of the VUE and means for transmitting a WUS to the second wireless device based on the location information associated with the expected path of the VUE.

A non-transitory computer-readable medium storing code for wireless communications at a first wireless device is described. The code may include instructions executable by a processor to receive, from a VUE, an iterative WUS, the iterative WUS including location information associated with an expected path of the VUE, where the iterative WUS instructs the first wireless device to transmit one or more other WUSs to at least a second wireless device that supports communication along a portion of the expected path of the VUE and transmit a WUS to the second wireless device based on the location information associated with the expected path of the VUE.

In some examples of the method, apparatuses, and non-transitory computer-readable medium described herein, transmitting the WUS may include operations, features, means, or instructions for transmitting a second iterative WUS including the location information associated with the expected path of the VUE, the iterative WUS instructing the second wireless device to transmit one or more additional WUSs to at least a third wireless device that supports communication along the portion of the expected path of the VUE.

Some examples of the method, apparatuses, and non-transitory computer-readable medium described herein may further include operations, features, means, or instructions for selecting a sequence from a set of sequences available for the iterative WUS, where the iterative WUS includes the sequence.

In some examples of the method, apparatuses, and non-transitory computer-readable medium described herein, transmitting the WUS may include operations, features, means, or instructions for transmitting the WUS to the second wireless device, the WUS indicating the second wireless device to activate one or more components for communication with the VUE.

In some examples of the method, apparatuses, and non-transitory computer-readable medium described herein, transmitting the WUS may include operations, features, means, or instructions for transmitting the WUS indicating the second wireless device to activate communication components, sensor components, or a combination thereof after a delay.

In some examples of the method, apparatuses, and non-transitory computer-readable medium described herein, transmitting the WUS may include operations, features, means, or instructions for transmitting an indication of the delay in the WUS.

In some examples of the method, apparatuses, and non-transitory computer-readable medium described herein, transmitting the WUS may include operations, features, means, or instructions for transmitting, within the WUS, a source identifier associated with the VUE.

Some examples of the method, apparatuses, and non-transitory computer-readable medium described herein may further include operations, features, means, or instructions for activating one or more components of the first wireless device based on the iterative WUS and communicating with the VUE using the one or more components after activating the one or more components.

In some examples of the method, apparatuses, and non-transitory computer-readable medium described herein, the one or more components may be activated after a delay.

Some examples of the method, apparatuses, and non-transitory computer-readable medium described herein may further include operations, features, means, or instructions for activating a low power mode for one or more components of the first wireless device based on the VUE leaving a service area associated with the first wireless device.

Some examples of the method, apparatuses, and non-transitory computer-readable medium described herein may further include operations, features, means, or instructions for activating the low power mode for a sensor system of the first wireless device after a first delay based on the VUE leaving a first portion of the service area associated with the first wireless device and activating the low power mode for a communication system of the first wireless device after a second delay based on the VUE leaving a second portion of the service area associated with the first wireless device.

Some examples of the method, apparatuses, and non-transitory computer-readable medium described herein may further include operations, features, means, or instructions for receiving, from the VUE, positioning information associated with the VUE and activating a low power mode for one or more components of the first wireless device based on the positioning information with the VUE and the location information of the VUE.

A method for wireless communications at a second wireless device is described. The method may include receiving, from a first wireless device along an expected path of a VUE, a WUS indicating the second wireless device to activate one or more components for communication with a VUE based on the second wireless device supporting communication along at least a portion of the expected path of the VUE and activating one or more components of the second wireless device based on the WUS.

An apparatus for wireless communications at a second wireless device is described. The apparatus may include a processor, memory coupled with the processor, and one or more instructions stored in the memory. The one or more instructions may be executable by the processor to, based at least in part on the one or more instructions, cause the apparatus to receive, from a first wireless device along an expected path of a VUE, a WUS indicating the second wireless device to activate one or more components for communication with a VUE based on the second wireless device supporting communication along at least a portion of the expected path of the VUE and activate one or more components of the second wireless device based on the WUS.

Another apparatus for wireless communications at a second wireless device is described. The apparatus may include means for receiving, from a first wireless device along an expected path of a VUE, a WUS indicating the second wireless device to activate one or more components for communication with a VUE based on the second wireless device supporting communication along at least a portion of the expected path of the VUE and means for activating one or more components of the second wireless device based on the WUS.

A non-transitory computer-readable medium storing code for wireless communications at a second wireless device is described. The code may include instructions executable by a processor to receive, from a first wireless device along an expected path of a VUE, a WUS indicating the second wireless device to activate one or more components for communication with a VUE based on the second wireless device supporting communication along at least a portion of the expected path of the VUE and activate the one or more components of the second wireless device based on the WUS.

In some examples of the method, apparatuses, and non-transitory computer-readable medium described herein, activating the one or more components of the second wireless device may include operations, features, means, or instructions for activating both a communication system and a sensor system of the second wireless device after a delay.

Some examples of the method, apparatuses, and non-transitory computer-readable medium described herein may further include operations, features, means, or instructions for receiving an indication of the delay from the first wireless device.

In some examples of the method, apparatuses, and non-transitory computer-readable medium described herein, activating the one or more components of the second wireless device may include operations, features, means, or instructions for activating a communication system of the second wireless device after a first delay based on the WUS and activating a sensor system of the second wireless device after a second delay, where the second delay may be different than the first delay.

Some examples of the method, apparatuses, and non-transitory computer-readable medium described herein may further include operations, features, means, or instructions for transmitting a second WUS to a third wireless device, the second WUS indicating the third wireless device to activate at least one component of the third wireless device for communication with the VUE, the third wireless device supporting communication along at least a second portion of the expected path of the VUE.

In some examples of the method, apparatuses, and non-transitory computer-readable medium described herein, transmitting the second WUS may include operations, features, means, or instructions for transmitting location information associated with the VUE to the third wireless device.

In some examples of the method, apparatuses, and non-transitory computer-readable medium described herein, transmitting the second WUS may include operations, features, means, or instructions for transmitting a non-iterative WUS to the third wireless device.

DETAILED DESCRIPTION

Figure 1:
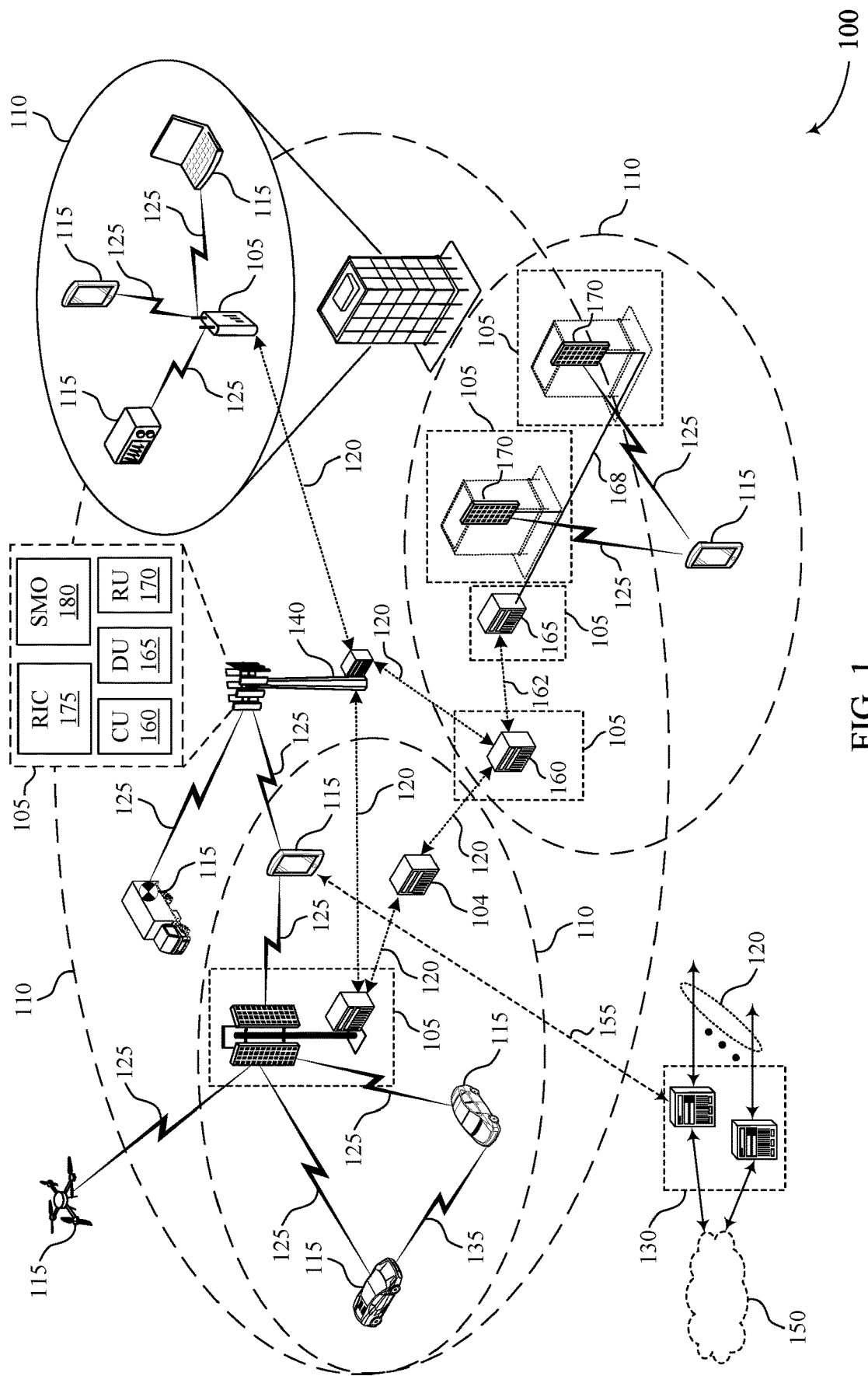
FIG. 1 illustrates an example of a wireless communications system that supports iterative wake up signaling for power saving in accordance with one or more aspects of the present disclosure.

Wireless communications systems may include wireless devices supporting communications in a mobile environment, such as when a user equipment (UE) is located in or associated with a vehicle or other device in a mobile (e.g., train, airplane, drone). A communication network may implement roadside units (RSUs) to provide safety information to a UE, such as a vehicle UE (VUE) in such a mobile environment. An RSU may provide safety information to a VUE (e.g., when the VUE is in the vicinity or in a communication coverage area of the RSU). In some cases, an RSU may be equipped with both sensor systems (e.g., for detecting safety hazards or safety information) and communication systems (e.g., for communicating safety information to the VUE). However, RSUs may consume power to maintain sensor systems and communication systems. In some cases, RSUs may consume power to maintain these systems during time periods where there are no VUEs (e.g., during certain time periods when there is little vehicle traffic), and in such systems, the RSU may not have any VUEs with which to communicate safety information collected by the RSU (e.g., through the sensor system), so the RSU may enter a low power mode.

In some cases, communications systems may implement the use of wake-up signals (WUSs), which may be used to reduce power consumption at a network entity, a UE, a VUE, or a combination thereof and prevent or reduce unnecessary waking up or activation of components of one or more wireless devices. In some cases, a VUE may wake up an RSU when the VUE enters the vicinity of the RSU. For example, a VUE may transmit a WUS to each RSU that the VUE encounters as the VUE travels. In such an example, the RSU may not wake up in time to gather information (e.g., safety information) and transmit the information to the VUE, and the VUE may not receive safety awareness or communications related to the information from the RSU before the VUE exits the range of the RSU. Such an approach may result in the VUE not receiving timely information when traveling.

The described techniques includes the use of an iterative WUS, which may allow an RSU to provide timely safety information to a VUE, while limiting power consumption of the network (e.g., the RSU). For example, A VUE may wake up a first RSU (e.g., with an iterative WUS) in its vicinity and provide location information (e.g., an expected path or way points associated with an origin of the VUE and a destination of the VUE). The first RSU may determine (e.g., select) a second RSU based on the location information provided by the VUE (e.g., the second RSU may be located along or may support communication along the expected path or in the vicinity of a way point of the VUE) and wake up the second RSU by transmitting an iterative or normative (e.g., non-iterative) WUS to the second RSU. In case of an iterative WUS transmission from the first RSU to the second RSU, respective iterative WUS transmissions from one RSU to another along the expected path may continue until a last RSU receives a normative (e.g., non-iterative) WUS.

After an RSU determines that the VUE has exited a communication coverage area supported by the RSU, the RSU may enter a power saving mode (e.g., a low power mode), which may involve deactivation of one or more components of the RSU. A VUE-initiated iterative WUS transmitted to consecutive RSUs may increase power savings of the network and enable the network to provide timely safety information to the VUE.

Aspects of the disclosure are initially described in the context of wireless communications systems. Aspects of the disclosure are then described in the context of systems and a process flow. Aspects of the disclosure are further illustrated by and described with reference to apparatus diagrams, system diagrams, and flowcharts that relate to iterative wake up signaling for power saving.

FIG. 1 illustrates an example of a wireless communications system 100 that supports iterative wake up signaling for power saving in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support iterative wake up signaling for power saving as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115, such as a VUE, may transmit an iterative WUS to a first network entity 105 (e.g., a first RSU). The iterative WUS may include location information associated with an expected path of the UE 115. For example, the location information may include a map or waypoints associated with the expected path. The iterative WUS may instruct the first network entity 105 to transmit one or more WUSs to one or more other network entities 105 that support communication along a portion of the expected path of the UE 115 (e.g., the service area or communication coverage area of the one or more other network entities 105 may include a portion of the expected path). Based on the iterative WUS, the first network entity 105 may transmit a WUS (e.g., iterative or normative based on the location information) to a second network entity 105. The second network entity 105 may transmit a WUS to a third network entity 105, and so on until a final network entity 105 associated with the expected path of the UE 115 is woken up (e.g., a network entity that supports communication at the destination of the UE 115). Based on receiving a WUS (iterative or normative) a network entity 105 may activate components (e.g., sensor system, communication system) and provide safety information to the UE 115. Once the UE 115 leaves the service area associated with the network entity 105, the network entity 105 may activate a low power mode. Through the use of the iterative WUS, the UE 115 may receive timely information, such as safety information including environmental or traffic information, while improving the power savings capabilities of one or more components of the network entities 105 (e.g., one or more components of the RSUs including sensor components or communication components of the RSUs).

WUSs may be implemented in downlink transmissions to reduce power consumption. For example, to avoid unnecessary wake ups for a UE 115, a network entity 105 may transmit a WUS. In some cases, a network entity 105 may transmit a WUS across a narrow band (e.g., one or more subcarriers). In some cases, a UE 115 may be able to decode a WUS with low power consumption (e.g., while the UE 115 is in a low power mode).

The UE 115 may decode a downlink control channel (e.g., a PDCCH) if the UE 115 decodes a wake-up indication (WI). After decoding a WI, the UE 115 may perform a downlink shared channel (e.g., PDSCH) decoding. In some cases, the UE 115 may remain in an active (e.g., non-low power) state for a period of time (e.g., a preconfigured amount of time) following the reception of the WUS, then activate a low power mode unless the UE 115 receives another PDCCH before the end of the period of time.

Alternatively, WUSs may be implemented by the UE 115 (e.g., a cell WUS (C-WUS)) to wake up the network (e.g., the network entity 105), which may increase power savings at the network. In some cases, the network may configure the UE 115 for transmitting C-WUS. When no C-WUS is detected by the network entity 105, the network entity 105 may perform SSB transmission, and detection of C-WUS. If the UE 115 detects SSB indicating that system information block 1 (SIB1) is not transmitted, the UE 115 may transmit a C-WUS to trigger SIB1 transmission. If the UE 115 detects SSB indicating SIB1 transmission, then the UE 115 may not transmit a C-WUS, and instead decode (e.g., read) the SIB1 information. In some cases, when the network entity 105 is active, the network entity 105 may broadcast an active state to avoid unnecessary C-WUS transmissions from the UE 115 and unnecessary C-WUS detection by the network entity 105.

Figure 2:
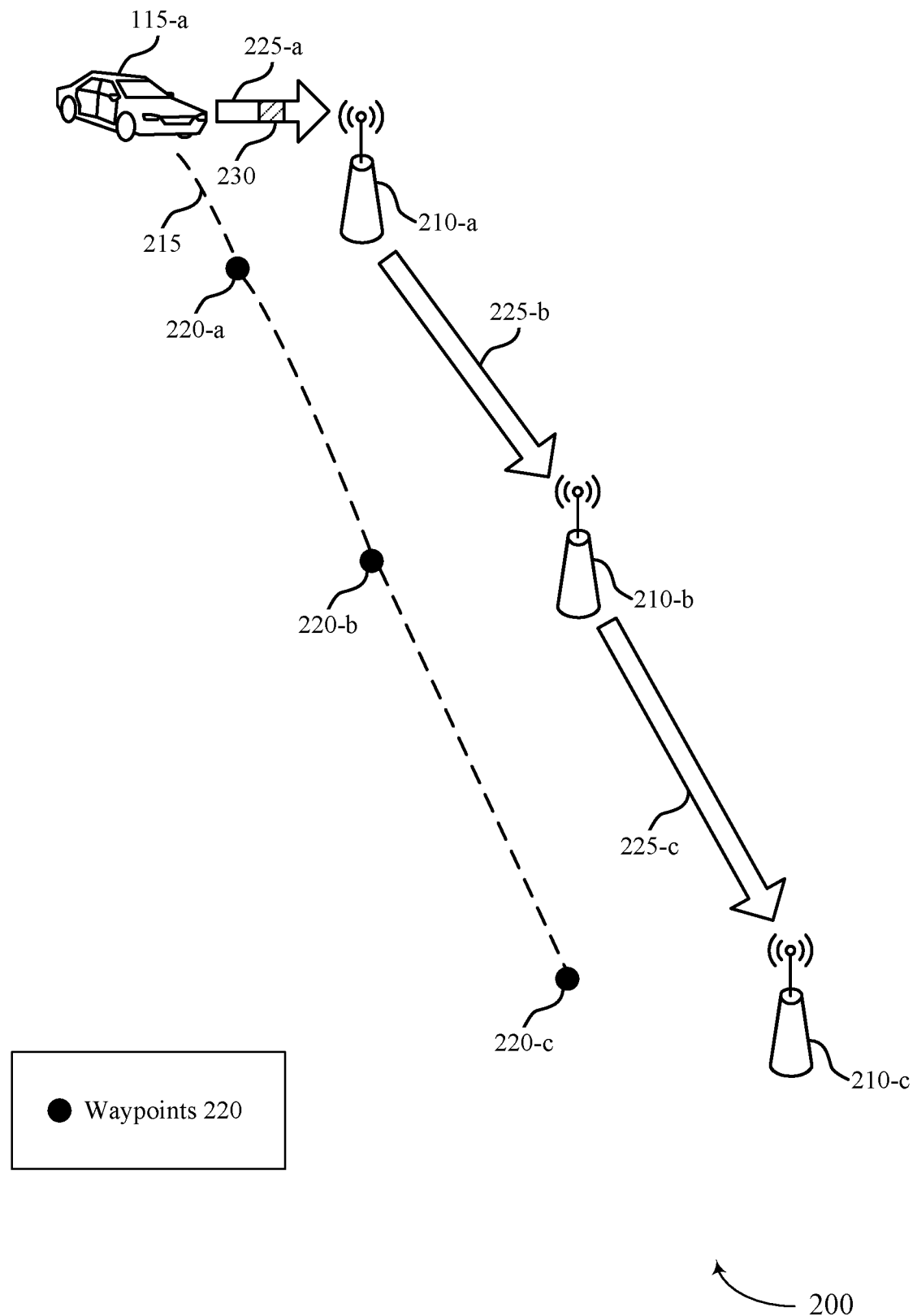
FIG. 2 illustrates an example of a system diagram that supports iterative wake up signaling for power saving in accordance with one or more aspects of the present disclosure.

FIG. 2 illustrates an example of a system 200 that supports iterative wake up signaling for power saving in accordance with one or more aspects of the present disclosure. The system 200 may include a VUE 115-a, which may be an example of a UE 115 as described herein, and one or more RSUs 210, which may be part of a communication network, each of which may be an example of a network entity 105 as described herein.

An RSU 210 may provide safety information to a VUE 115-a when the VUE 115-a is in the vicinity of an RSU 210 (within a coverage area over which RSU 210 supports communication, a range of a location of the RSU 210, etc.). For example, an RSU 210 may be equipped with both a sensor system (e.g., for detecting safety hazards or safety information) and a communication system (e.g., for communicating safety information to the VUE 115-a). However, RSUs 210 may consume power to maintain the sensor and communication systems and may implement a low power mode (e.g., a power saving mode) at the RSU 210 during low traffic hours (e.g., at night when there are less VUEs 115).

In some cases, system 200 may implement WUSs to facilitate wake ups of one or more wireless devices (e.g., VUE 115-a, RSUs 210) when the wireless device is in a low power mode. For instance, a VUE 115-a may be capable of waking up an RSU 210 that is in a low power mode by transmitting a WUS (e.g., iterative WUS 225-a). However, if a VUE 115-a sends a WUS to each RSU 210 as it enters a service area associated with a given RSU 210 (e.g., the vicinity of the RSU 210), the given RSU may not wake up in time to gather information (e.g., through the RSU 210 sensor system), transmit the information to the VUE 115-a, and perform communications with the VUE 115-a before the VUE 115-a leaves the service area associated with the RSU 210. For example, a VUE 115-a may be associated with an RSU 210 (e.g., within the service area of the RSU 210) for a limited period of time, which may not be sufficient for providing safety information.

System 200 may implement iterative WUSs to improve power savings of the network (e.g., the RSUs 210) while providing timely safety information to the VUE 115-a. For example, a VUE 115-a may transmit an iterative WUS 225-a to a first RSU 210-a (e.g., prior to or when the VUE 115-a enters the service area of the first RSU 210-a). In some cases, sequences may be specific for iterative WUSs and the VUE 115-a may select a sequence from a set of sequences available for the iterative WUS 225-a (e.g., a preconfigured wake-up sequence), and the iterative WUS 225-a may include the selected sequence. The iterative WUS 225-a may include location information associated with an expected path 215 of the VUE 115-a. For example, the location information may include an expected path 215 (e.g., a map associated with the expected path of the VUE) or waypoints 220 (e.g., waypoint 220-a, waypoint 220-b, waypoint 220-c) that the VUE 115-a may intend to take to from its source to a destination, source location information (e.g., the origin of the expected path), destination location information (e.g., the end of the expected path), or any combination thereof. In some cases, the VUE 115-a may also transmit, to the first RSU 210-a, positioning information of the VUE which may include the speed of the VUE 115-a, a direction of the VUE 115-a, or any combination thereof.

In some cases, the VUE 115-a may transmit, within the iterative WUS 225-a, a source identifier associated with the VUE 115-a (e.g., the source identifier may distinguish the VUE 115-a from other VUEs 115 or devices in the system 200). In other cases, the VUE 115-a may transmit a message including the source identifier. In some cases, the message may be a sidelink control information (SCI) message that includes the source identifier.

The iterative WUS 225-a may instruct the first RSU 210-a to transmit one or more other WUS (e.g., based on the iterative WUS 225-a being iterative) to at least a second RSU (e.g., a second RSU 210-b) that supports communication along a portion of the expected path of the VUE 115-a (e.g., the location information may indicate that VUE 115-a will pass through a service area associated with the second RSU 210-b). For example, the second RSU 210-b may support communications for the VUE 115-a at waypoint 220-b, while the first RSU 210-a may support communications for the VUE 115-a at waypoint 220-a. The VUE 115-a may include a field 230 in the iterative WUS 225-a, and the field 230 may include one or more bits indicating that the iterative WUS 225-a is iterative. In some cases, the one or more bits may indicate the WUS type associated with the WUS, which may indicate the WUS type being one of iterative or normative (non-iterative). The first RSU 210-a may determine that the iterative WUS 225-a is iterative (e.g., based on the one or more bits included in the field 230) and may select one or more RSUs to which the first RSU 210-a is to transmit a WUS. For instance, the first RSU 210-a may determine to wake up a second RSU 210-b based on the location information (e.g., because the second RSU 210-b is associated with, located along, or supports communication along a portion of the expected path 215 of the VUE 115-a (i.e., where the VUE 115-a may travel to a future time). Based on the location information, the first RSU 210-a may transmit an iterative WUS to the second RSU 210-b (e.g., if the second RSU 210-b is not the final RSU 210 along the expected path 215) or a normative WUS (e.g., non-iterative) to the second RSU 210-b (e.g., if the second RSU 210-b is the last RSU 210 along the expected path 215.

In some cases, based on the iterative WUS 225-a, the first RSU 210-a may activate one or more components of the first RSU 210-a (e.g., sensor components, communication components) and communicate with the VUE 115-a using the one or more components after activation. In some cases, the first RSU 210-a may activate the components after a delay, which may be indicated by the VUE 115-a (e.g., in SCI or iterative WUS 225-a), or may be configured through other signaling (e.g., RRC or MAC layer signaling).

The first RSU 210-a may transmit an iterative WUS 225-b to the second RSU 210-b. In some cases, the first RSU 210-a may select a sequence from a set of sequences available for the iterative WUS 225-b to include in the iterative WUS 225-b. The iterative WUS 225-b may include the location information associated with the expected path of the VUE 115-a. In some cases, in the iterative WUS 225-b, the first RSU 210-a may only include aspects of the location information that are relevant to the second RSU 210-b and future RSUs 210 (e.g., a third RSU 210-c), the location information in its entirety, or a combination thereof (e.g., the first RSU 210-a may not include current location information or origin information associated with the VUE 115-a which may not be useful to the second RSU 210-b at the time the VUE 115-a enters the vicinity of the second RSU 210-b). The iterative WUS 225-b may, in some cases, instruct the second RSU 210-b to transmit one or more additional WUSs to at least the third RSU 210 (e.g., the third RSU 210-c) that supports communication along a portion of the expected path 215 of the VUE 115-a (e.g., if a service area associated with the third RSU 210-c is along the expected path 215 of VUE 115-a). For example, the third RSU 210-c may support communications with the VUE 115-a at waypoint 220-c. In some cases, the iterative WUS 225-b may also include the source identifier associated with the VUE 115-a.

In some cases, the iterative WUS 225-b may indicate the second RSU 210-b to activate one or more components for communication with the VUE (e.g., sensor components, communication components, or any combination thereof). In some cases, the iterative WUS 225-b may indicate the second RSU 210-b to activate communication components, sensor components, or a combination thereof after a delay, and the first RSU 210-a may transmit an indication of the delay to the second RSU 210-b. For example, the first RSU 210-a may indicate the second RSU 210-b to wake up both the communication components (e.g., the communication system) and the sensor components (e.g., the sensor system) after the delay. In some cases, the delay may enable the second RSU 210-b to be woken up with sufficient time before the VUE 115-a enters the service area of the second RSU 210-b, while balancing waking up early to avoid or reduce unnecessary power consumption at the second RSU 210-b. In another example, the first RSU 210-a may indicate the second RSU 210-b to wake up the communication components of the second RSU 210-b after a first delay (e.g., 0 ms, 1 ms, 2 ms) to enable communications with the VUE 115-a, and to wake up the sensor components of the second RSU 210-b after a second delay (e.g., with sufficient time to gather safety information to be provided, such as 1 s, 2 s). Waking up the sensor components of the second RSU 210-b after a second delay may increase power savings while allowing the second RSU 210-b to wake up the communication components.

As indicated by the iterative WUS 225-b, the second RSU 210-b may transmit a normative (e.g., non-iterative) WUS to the third RSU 210-c. For example, the second RSU 210-b may transmit a normative WUS based on the third RSU 210-c being the last RSU 210 associated with the expected path of the VUE 115-a (e.g., based on the location information), and the wake up procedure may end with the third RSU 210-c. In some cases, the WUS 225-c may indicate the third RSU 210-c to activate one or more components for communication with the VUE 115-a. In some cases, the WUS 225-c may include the location information associated with the VUE 115-a.

After receiving the WUS 225-c, which may be a normative WUS, the third RSU 210-c may activate one or more components of the third RSU 210 based on receiving the WUS 225-c. The third RSU 210-c may communicate with the VUE 115-a using the one or more components (e.g., while the VUE 115-a is located within a portion of the expected path associated with the third RSU 210-c). For example, the third RSU 210-c may activate a sensor component (e.g., a sensor system), a communication component (e.g., a communication system) of the third RSU 210-c. In some cases, the third RSU 210-c may activate the one or more components after a delay (e.g., based on the WUS 225-c), where the delay may be indicated in a WUS 225-c or in a separate message.

In some cases, the RSUs 210 may activate (e.g., re-enter) a low power mode for the one or more components of the RSU 210 when the VUE 115-a leaves a service area associated with the RSU 210. For example, based on the source identifier associated with the VUE 115-a (e.g., the source identifier the VUE 115-a may transmit in the iterative WUS 225-a or in a message, such as an SCI message) the RSU 210 may confirm (e.g., determine) the presence of the VUE 115-a in the service area (e.g., vicinity) of the RSU 210, and once the VUE 115-a leaves the service area (e.g., goes out of range (e.g., communication range) of the RSU 210) the RSU 210 may activate the low power mode for one or more components. In some cases, the RSU 210 may activate the low power mode for different components and based on one or more delays. For instance, the RSU 210 may activate a low power mode for a sensor system (e.g., the sensor components) after a first delay based on the VUE 115-*a* leaving a first portion of the service area associated with the RSU 210, and the RSU 210 may activate low power mode of the communication system (e.g., the communication components) after a second delay based on the VUE 115-*a* leaving a second portion of the service area associated with the RSU 210. For example, once the RSU 210 determines the VUE 115-*a* has left a first portion of the service area of RSU 210, the RSU may initially switch off, deactivate, or enter a sleep mode for one or more components of the sensor system after a first delay, then switch off, deactivate, or enter a sleep mode for one or more components of the communication system (e.g., enter a deep sleep mode) after a second delay, where the first delay may be different than the second delay.

In some cases, the RSU 210 may determine (e.g., verify) that the VUE 115-*a* has left a portion of the service area by measuring a receive power (e.g., reference signal received power (RSRP)) associated with one or more reference signals of the VUE 115-*a* (based on the source identifier associated with the VUE 115-*a*) and determining that the receive power is below a threshold. In another example, the RSU 210 may determine the VUE 115-*a* has left a portion of the service area by observing the VUE 115-*a* with its sensor system (e.g., camera, lidar, radar, or a combination thereof) and verifying that the VUE 115-*a* has travelled away from the RSU 210. In some cases, this may be implemented when the RSU 210 is unable to communicate with the VUE 115-*a* (e.g., due to fading, blockages, etc.). In other cases, the RSU 210 may activate the low power mode after a delay (e.g., a preconfigured time duration) from when the RSU 210 received the WUS (e.g., iterative or normative). In some cases, the RSU 210 may activate the low power mode based on positioning information (e.g., speed) associated with the VUE 115-*a*. For example, based on the positioning information the RSU 210 may determine an elapsed time when the VUE 115-*a* is likely to have left a portion of the service area. For example, the elapsed time may be based on the speed of the VUE 115-*a* and the location information.

Figure 3:
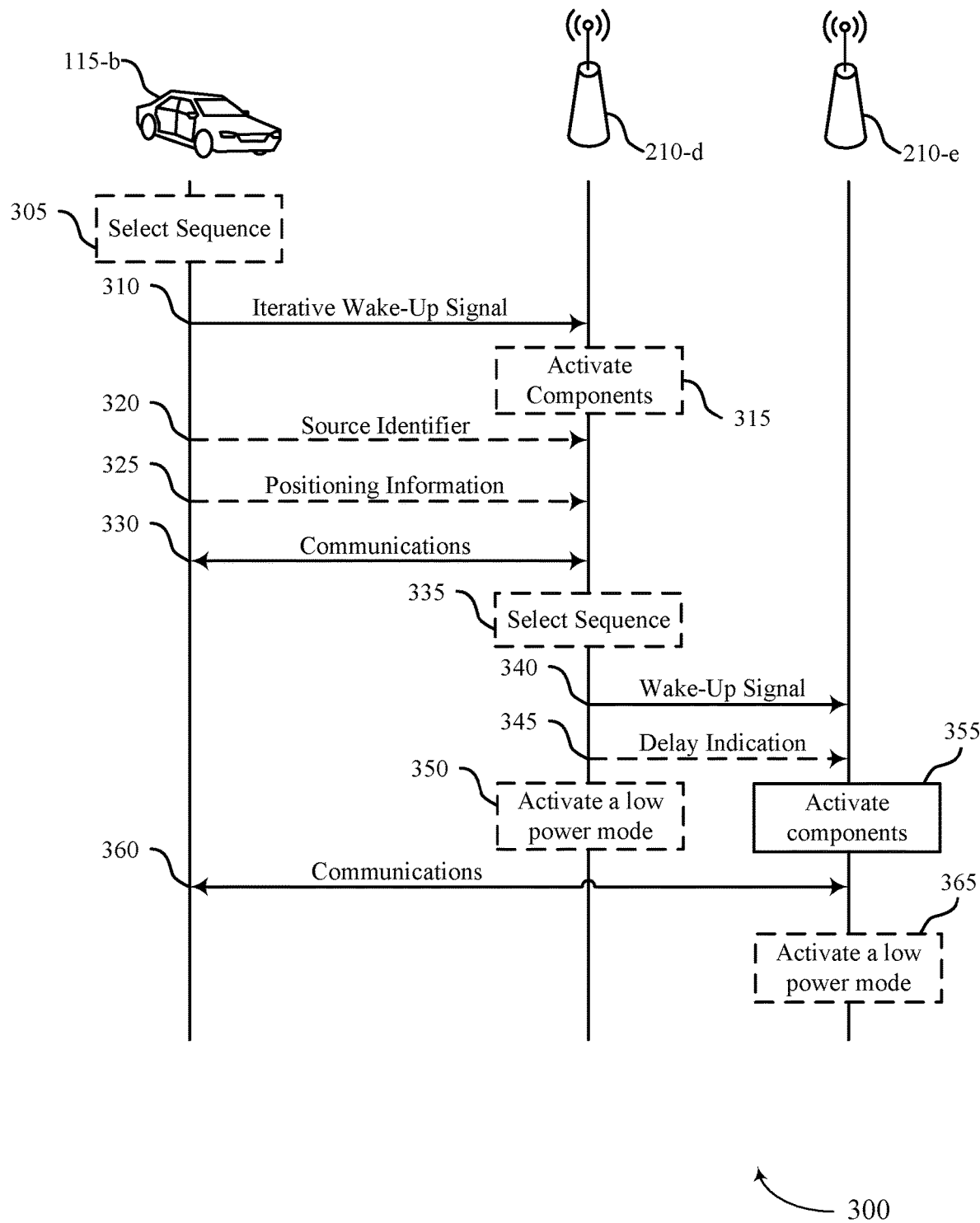
FIG. 3 illustrates an example of a process flow diagram that supports iterative wake up signaling for power saving in accordance with one or more aspects of the present disclosure.

FIG. 3 illustrates an example of a process flow 300 that supports iterative wake up signaling for power saving in accordance with one or more aspects of the present disclosure. The process flow 300 may implement various aspects of the present disclosure described with reference to FIGS. 1 and 2. The process flow may include VUE 115-*b* and RSUs 210-*d* and 210-*e* which may be examples of VUE 115-*a* and RSUs 210 as described with reference to FIG. 2.

In the following description of the process flow 300, the operations described may be performed in different orders or at different times. Some operations may also be left out of the process flow 300, or other operations may be added. Although VUE 115-*b* and RSUs 210-*d* and 210-*e* are shown performing the operations of the process flow 300, some aspects of some operations may also be performed by other elements of the process flow 300 or by elements that are not depicted in the process flow, or any combination thereof.

In some cases, at 305, VUE 115-*b* may select a sequence from a set of sequences available for an iterative WUS to include in the iterative WUS, as described with reference to FIG. 2.

At 310, VUE 115-*b* may transmit, and RSU 210-*d* may receive, an iterative WUS. The iterative WUS may be an example of an iterative WUS as described with reference to FIG. 2. For example, the iterative WUS may include location information associated with an expected path of the VUE 115-*b*, and may instruct RSU 210-*d* to transmit one or more other WUSs to at least a second RSU (e.g., RSU 210-*e*) that supports communication along the expected path of VUE 115-*b*. As described with reference to FIG. 2, the iterative WUS may include a field including one or more bits to indicate the WUS is iterative, a source identifier associated with VUE 115-*b*, or any combination thereof.

In some cases, at 315, based on the iterative WUS, RSU 210-*d* may activate one or more components, as described with reference to FIG. 2. In some cases, as described with reference to FIG. 2, RSU 210-*d* may activate one or more components after a delay.

In some cases, at 320, VUE 115-*b* may transmit, and RSU 210-*d* may receive, a message including a source identifier. In some cases, RSU 210-*d* transmitting the message may include transmitting a sidelink control information message that includes the source identifier associated with the VUE 115-*b*.

In some cases, at 325, VUE 115-*b* may transmit and RSU 210-*d* may receive, positioning information of the VUE as described with reference to FIG. 2. The positioning information may include a speed of VUE 115-*b*, a direction of VUE 115-*b*, or both.

At 330, VUE 115-*b* and RSU 210-*d* may perform communications (e.g., while VUE 115-*b* is in a service area associated with RSU 210-*d*). For example, RSU 210-*d* may transmit safety information to VUE 115-*b* that is relevant to the service area associated with RSU 210-*d*.

In some cases, at 335, RSU 210-*d* may select a sequence from a set of sequences available for an iterative WUS to transmit to RSU 210-*e*. For example, if the iterative WUS transmitted at 310 indicates that RSU 210-*d* is to transmit an iterative WUS rather than a normative WUS to RSU 210-*e* (e.g., RSU 210-*e* is not the final RSU 210 associated with the expected path of VUE 115-*b*).

At 345, RSU 210-*d* may transmit, and RSU 210-*e* may receive, a WUS. The WUS may be iterative or normative (e.g., non-iterative) based on the location information transmitted by VUE 115-*b* in the iterative WUS at 310. For example, if the location information indicates that RSU 210-*e* is not the final RSU 210 associated with the expected path of VUE 115-*b*, RSU 210-*d* may transmit an iterative WUS at 340. In another example, if the location information indicates that RSU 210-*e* is the final RSU 210 associated with the expected path of VUE 115-*b*, RSU 210-*d* may transmit a normative WUS at 340. In some cases, if RSU 210-*d* transmits an iterative WUS at 340, the iterative WUS may include the location information associated with the expected path of VUE 115-*b*, and the iterative WUS may instruct RSU 210-*e* to transmit one or more other WUSs to at least another RSU 210 that supports communication along (e.g., has a service area associated with) a portion of the expected path of VUE 115-*b*. In some cases, RSU 210-*d* may include a source identifier (e.g., as described with reference to FIG. 2) associated with VUE 115-*b* in the WUS. In some cases, the WUS (e.g., iterative or normative) may indicate RSU 210-*e* to activate one or more components for communication with VUE 115-*b* (e.g., sensor components, communication components, or any combination thereof). In some cases, the WUS (e.g., iterative or normative) may indicate RSU 210-*e* to activate the one or more components after a delay. In some cases, RSU 210-*d* may include an indication of the delay in the WUS. In other cases, at 350, RSU 210-*d* may transmit and RSU 210-*e* may receive, an indication of the delay (e.g., separate from the WUS).

In some cases, at 350, RSU 210-*d* may activate a low power mode, as described with reference to FIG. 2. For example, RSU 210-*d* may activate a low power mode for one or more components of RSU 210-*d* based on VUE 115-*b* leaving the service area associated with RSU 210-*d*. In some cases, RSU 210-*d* may activate the low power mode for a sensor system (e.g., including the sensor components) of RSU 210-*d* after a first delay based on VUE 115-*b* leaving a first portion of the service area associated with RSU 210-*d*. RSU 210-*d* may then activate the low power mode for a communication system (e.g., including the communication components) of RSU 210-*d* after a second delay based on VUE 115-*b* leaving a second portion of the service area associated with RSU 210-*d*. In some cases, the first delay may be different from the second delay, and the first portion of the service area may be different from the second portion. In some cases, RSU 210-*d* may determine that VUE 115-*b* has left the service area, or a portion of the service area, based on the source identifier of VUE 115-*b* (e.g., the source identifier included in the iterative WUS), by observing VUE 115-*b* through the sensor system of RSU 210-*d*, or any combination thereof. In some cases, RSU 210-*d* may activate the low power mode based on the positioning information transmitted at 325. For example, RSU 210-*d* may use the positioning information (e.g., speed, location, or any combination thereof) to determine an elapsed time after which VUE 115-*b* is likely to have left the service area associated with RSU 210-*d*. In other cases, RSU 210-*d* may activate the low power mode based on a time duration (e.g., a preconfigured time duration) after receiving the WUS.

At 355, based on the WUS transmitted at 340, RSU 210-*e* may activate one or more components of RSU 210-*e*. In some cases, RSU 210-*e* may activate both a communication system and a sensor system of RSU 210-*e* after a delay, which may be indicated in the WUS or at 345. In some cases, based on the WUS, RSU 210-*e* may activate the communication system after a first delay and the sensor system after a second delay, where the first delay may be different from the second delay.

At 360, VUE 115-*b* and RSU 210-*e* may perform communications (e.g., while VUE 115-*b* is within the service area associated with RSU 210-*e*). For example, RSU 210-*e* may transmit safety information associated with the service area of RSU 210-*e*.

In some cases, if RSU 210-*d* transmits an iterative WUS at 340, RSU 210-*e* may transmit a WUS (e.g., iterative or normative based on the location information), which may include the location information associated with VUE 115-*b*, to another RSU 210 along the expected path of VUE 115-*b*. In other cases, if RSU 210-*d* transmitted a normative WUS at 340, RSU 210-*e* may not transmit a WUS to another RSU 210 (e.g., because RSU 210-*e* may be the last RSU 210 along the expected path of VUE 115-*b*).

In some cases, at 365, RSU 210-*e* may activate a low power mode in a similar manner to that of RSU 210-*d* at 350. For example, RSU 210—may activate a low power mode based on VUE 115-*b* leaving the service are associated with RSU 210-*e*.

Through the methods described, a communications system may implement the use of iterative WUS to increase power savings of the network while providing timely safety information to VUE 115-*b* as it travels along the expected path.

Figure 4:
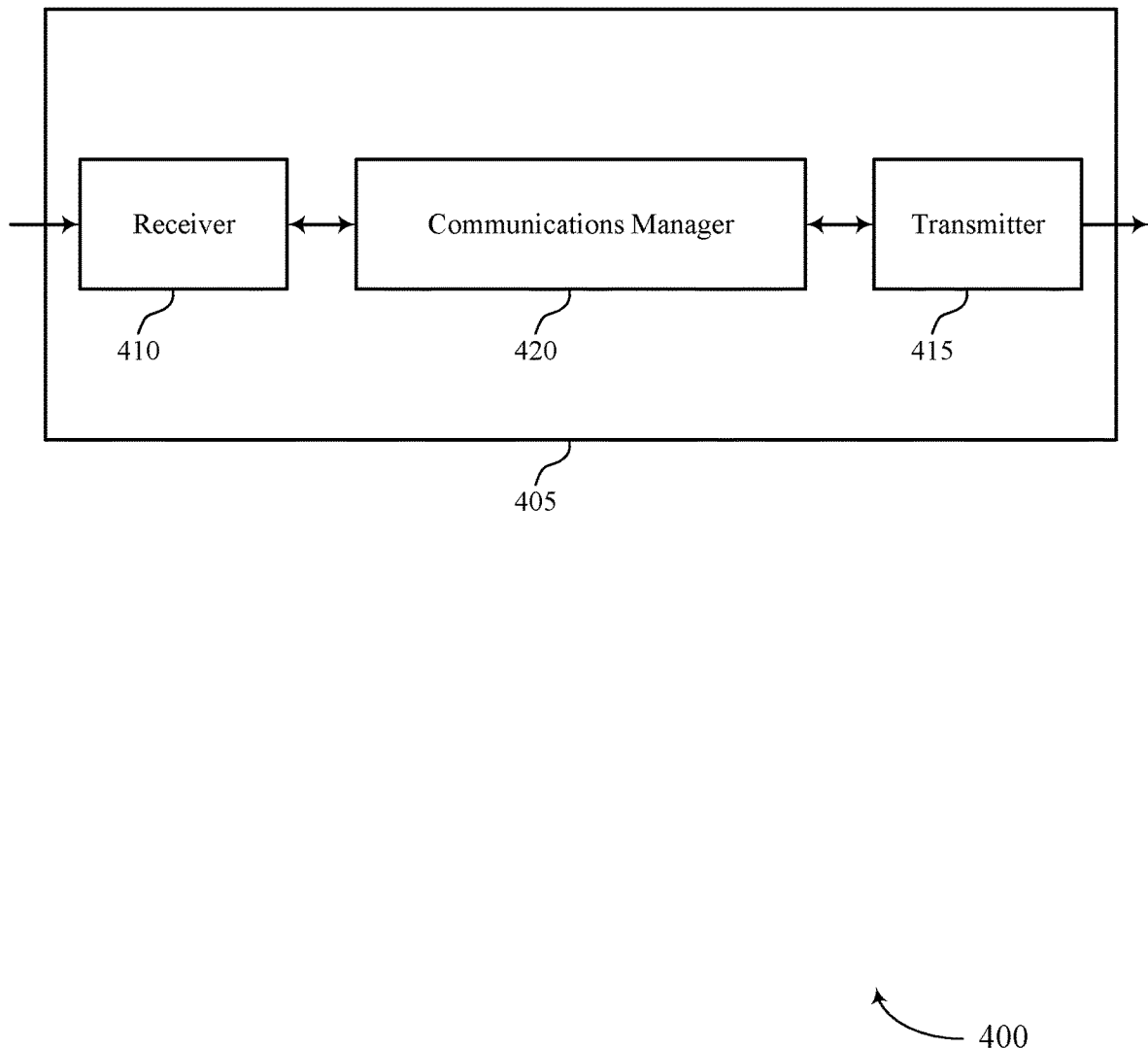
FIGS. 4 and 5 show block diagrams of devices that support iterative wake up signaling for power saving in accordance with one or more aspects of the present disclosure.

FIG. 4 shows a block diagram 400 of a device 405 that supports iterative wake up signaling for power saving in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to iterative wake up signaling for power saving). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to iterative wake up signaling for power saving). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of iterative wake up signaling for power saving as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a VUE in accordance with examples as disclosed herein. For example, the communications manager 420 may be configured as or otherwise support a means for transmitting an iterative wake-up signal to a first wireless device, the iterative wake-up signal including location information associated with an expected path of the VUE, where the iterative wake-up signal instructs the first wireless device to transmit one or more other wake-up signals to at least a second wireless device that supports communication along a portion of the expected path of the VUE. The communications manager 420 may be configured as or otherwise support a means for communicating, by the VUE located within the portion of the expected path, with the second wireless device based on the iterative wake-up signal.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced power consumption through the use of an iterative WUS as described herein. For instance, the device 405 may transmit an iterative WUS to one or more other wireless devices, which may reduce the number of WUSs the device 405 may transmit when the device 405 is traveling. Such techniques may reduce overhead and complexity associated with the generation and transmission of WUSs.

Figure 5:
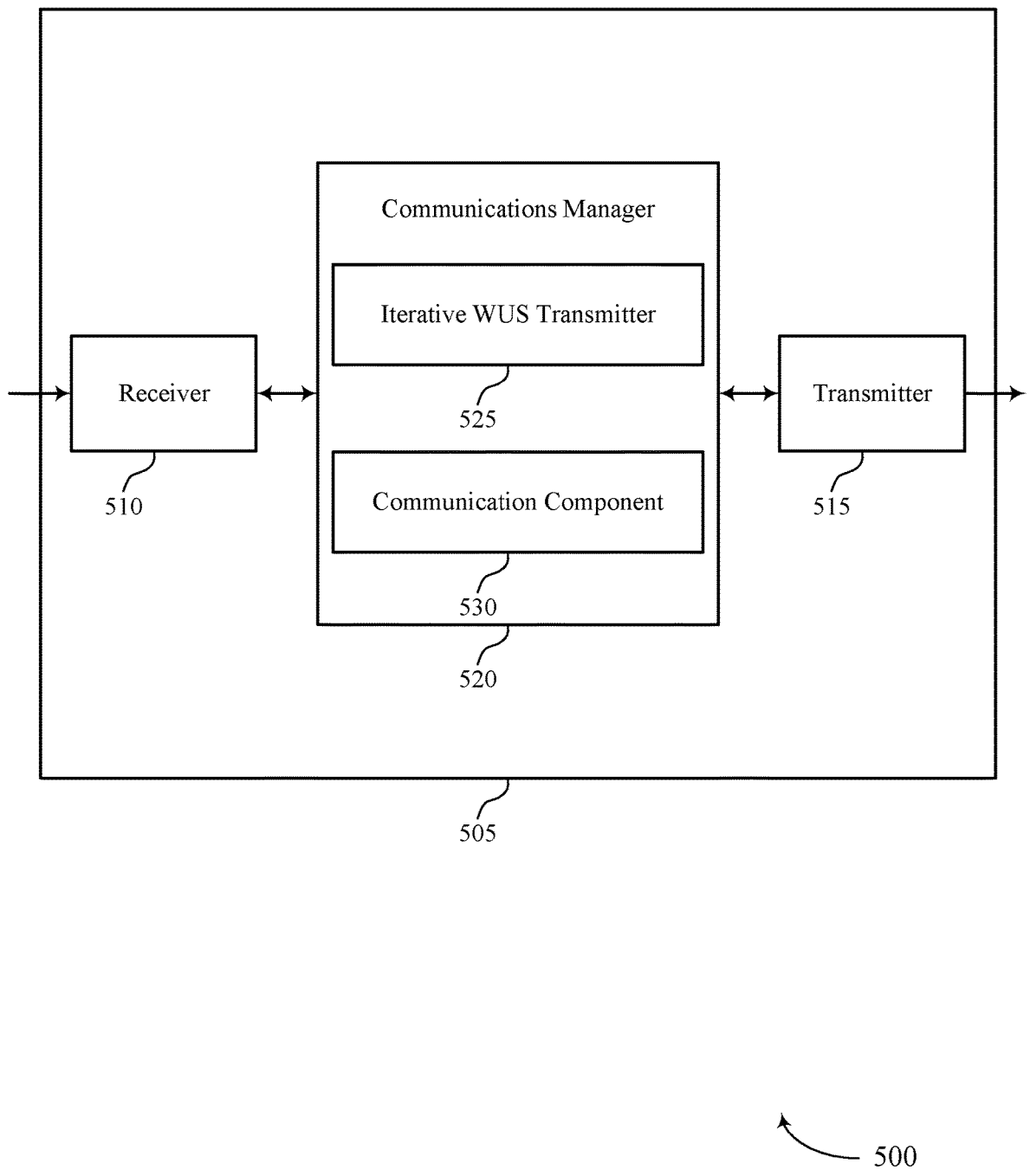

FIG. 5 shows a block diagram 500 of a device 505 that supports iterative wake up signaling for power saving in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to iterative wake up signaling for power saving). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to iterative wake up signaling for power saving). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of iterative wake up signaling for power saving as described herein. For example, the communications manager 520 may include an iterative WUS transmitter 525 a communication component 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a VUE in accordance with examples as disclosed herein. The iterative WUS transmitter 525 may be configured as or otherwise support a means for transmitting an iterative wake-up signal to a first wireless device, the iterative wake-up signal including location information associated with an expected path of the VUE, where the iterative wake-up signal instructs the first wireless device to transmit one or more other wake-up signals to at least a second wireless device that supports communication along a portion of the expected path of the VUE. The communication component 530 may be configured as or otherwise support a means for communicating, by the VUE located within the portion of the expected path, with the second wireless device based on the iterative wake-up signal.

Figure 6:
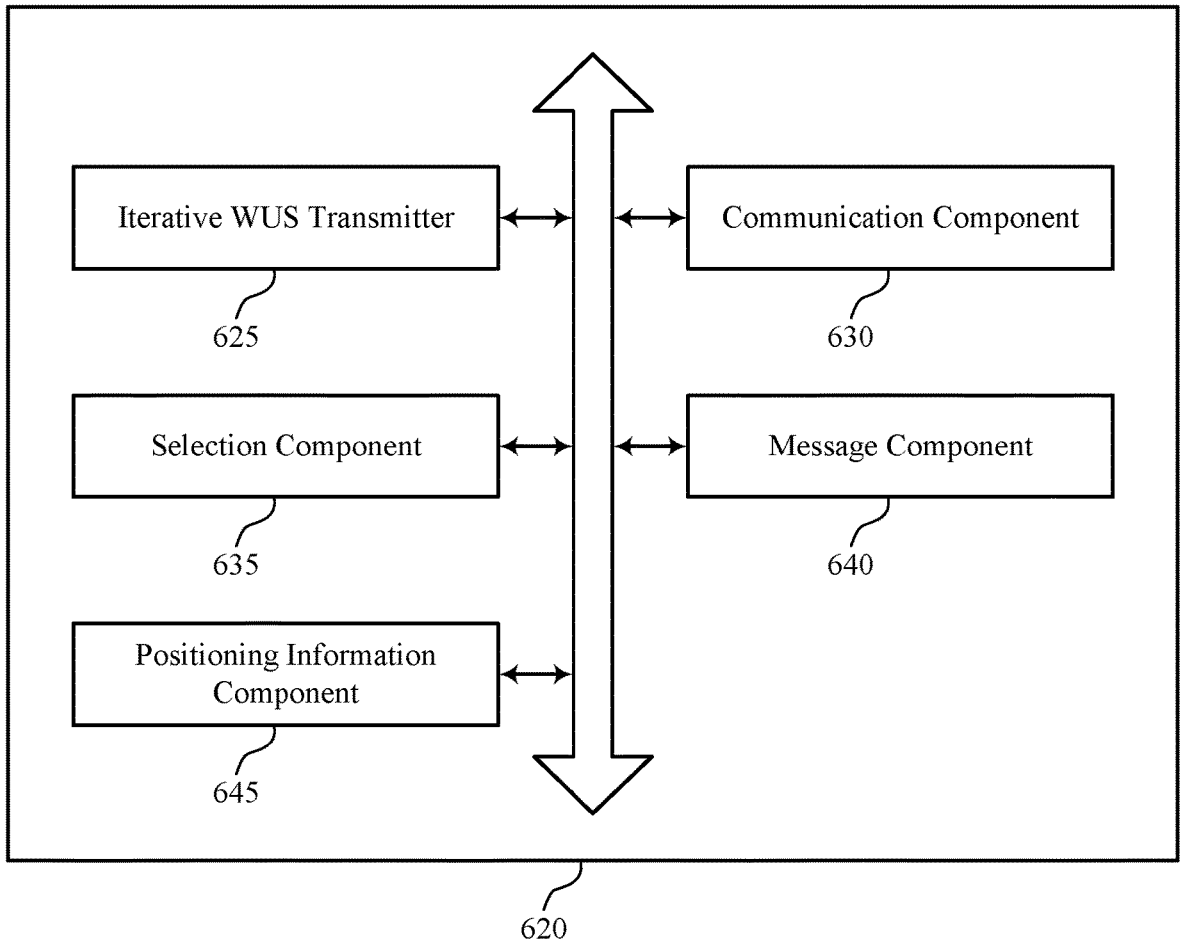
FIG. 6 shows a block diagram of a communications manager that supports iterative wake up signaling for power saving in accordance with one or more aspects of the present disclosure.

FIG. 6 shows a block diagram 600 of a communications manager 620 that supports iterative wake up signaling for power saving in accordance with one or more aspects of the present disclosure. The communications manager 620 may be an example of aspects of a communications manager 420, a communications manager 520, or both, as described herein. The communications manager 620, or various components thereof, may be an example of means for performing various aspects of iterative wake up signaling for power saving as described herein. For example, the communications manager 620 may include an iterative WUS transmitter 625, a communication component 630, a selection component 635, a message component 640, a positioning information component 645, or any combination thereof. Each of these components may communicate, directly or indirectly, with one another (e.g., via one or more buses).

The communications manager 620 may support wireless communications at a VUE in accordance with examples as disclosed herein. The iterative WUS transmitter 625 may be configured as or otherwise support a means for transmitting an iterative wake-up signal to a first wireless device, the iterative wake-up signal including location information associated with an expected path of the VUE, where the iterative wake-up signal instructs the first wireless device to transmit one or more other wake-up signals to at least a second wireless device that supports communication along a portion of the expected path of the VUE. The communication component 630 may be configured as or otherwise support a means for communicating, by the VUE located within the portion of the expected path, with the second wireless device based on the iterative wake-up signal.

In some examples, the selection component 635 may be configured as or otherwise support a means for selecting a sequence from a set of sequences available for the iterative wake-up signal, where the iterative wake-up signal includes the sequence.

In some examples, to support transmitting the iterative wake-up signal, the iterative WUS transmitter 625 may be configured as or otherwise support a means for transmitting, within the iterative wake-up signal, a field including one or more bits indicating that the iterative wake-up signal is iterative.

In some examples, to support transmitting the iterative wake-up signal, the iterative WUS transmitter 625 may be configured as or otherwise support a means for transmitting, within the iterative wake-up signal, a source identifier associated with the VUE.

In some examples, the message component 640 may be configured as or otherwise support a means for transmitting, to the first wireless device, a message including a source identifier associated with the VUE.

In some examples, to support transmitting the message, the message component 640 may be configured as or otherwise support a means for transmitting a sidelink control information message that includes the source identifier associated with the VUE.

In some examples, the positioning information component 645 may be configured as or otherwise support a means for transmitting, to the first wireless device, positioning information of the VUE, the positioning information including a speed of the VUE, a direction of the VUE, or both.

In some examples, the location information includes one or more waypoints associated with the expected path of the VUE, a map associated with the expected path of the VUE, source location information associated with the VUE, destination location information associated with the VUE, or any combination thereof.

Figure 7:
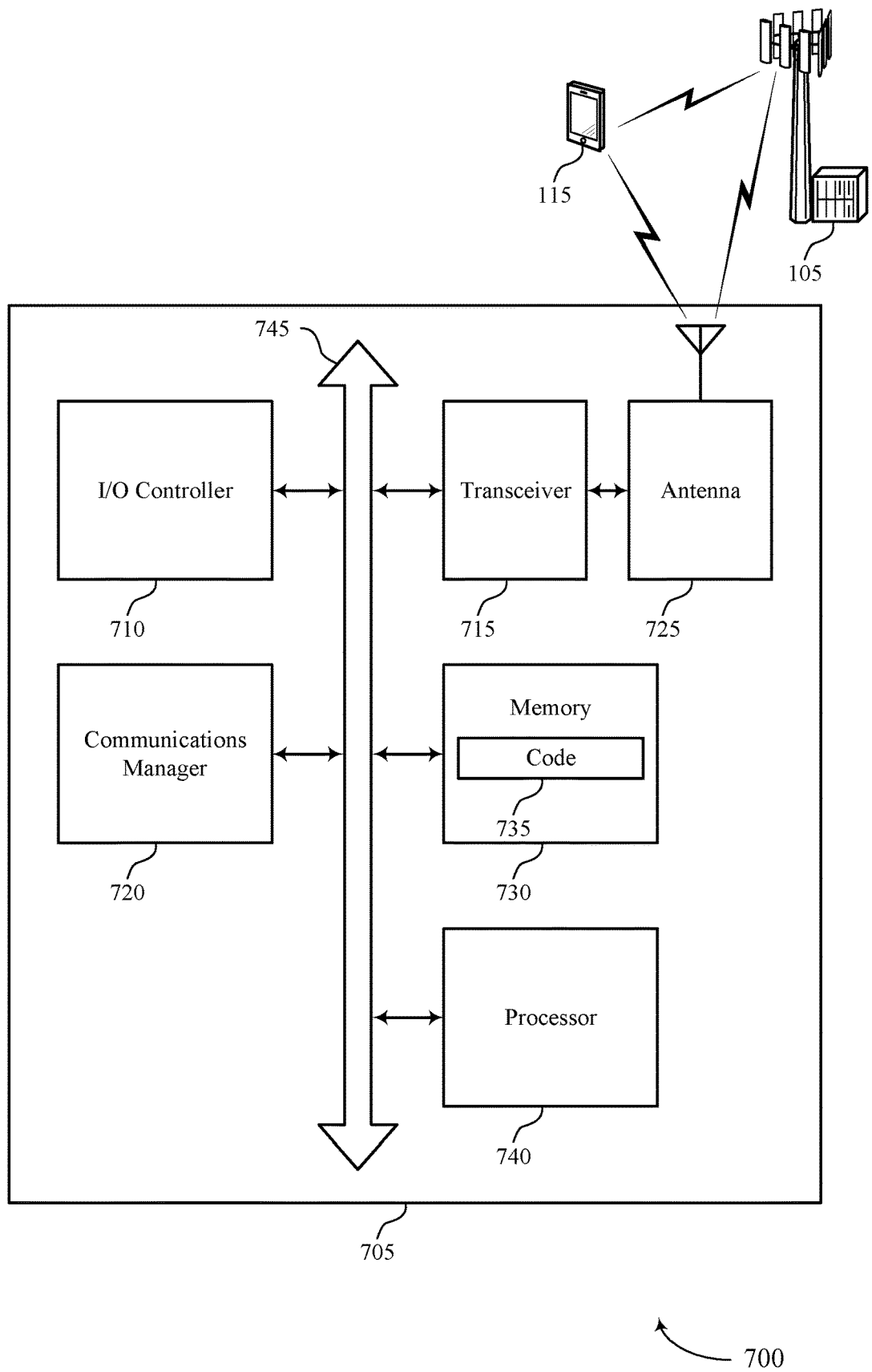
FIG. 7 shows a diagram of a system including a device that supports iterative wake up signaling for power saving in accordance with one or more aspects of the present disclosure.

FIG. 7 shows a diagram of a system 700 including a device 705 that supports iterative wake up signaling for power saving in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting iterative wake up signaling for power saving). For example, the device 705 or a component of the device 705 may include a processor 740 and memory 730 coupled with or to the processor 740, the processor 740 and memory 730 configured to perform various functions described herein.

The communications manager 720 may support wireless communications at a VUE in accordance with examples as disclosed herein. For example, the communications manager 720 may be configured as or otherwise support a means for transmitting an iterative wake-up signal to a first wireless device, the iterative wake-up signal including location information associated with an expected path of the VUE, where the iterative wake-up signal instructs the first wireless device to transmit one or more other wake-up signals to at least a second wireless device that supports communication along a portion of the expected path of the VUE. The communications manager 720 may be configured as or otherwise support a means for communicating, by the VUE located within the portion of the expected path, with the second wireless device based on the iterative wake-up signal.

By including or configuring the communications manager 720 in accordance with examples as described herein, the device 705 may support techniques for increased power savings, which may improve battery life at the device 705, reduce latency experienced by the device 705, and improve user experience for a user of the device 705.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of iterative wake up signaling for power saving as described herein, or the processor 740 and the memory 730 may be otherwise configured to perform or support such operations.

Figure 8:
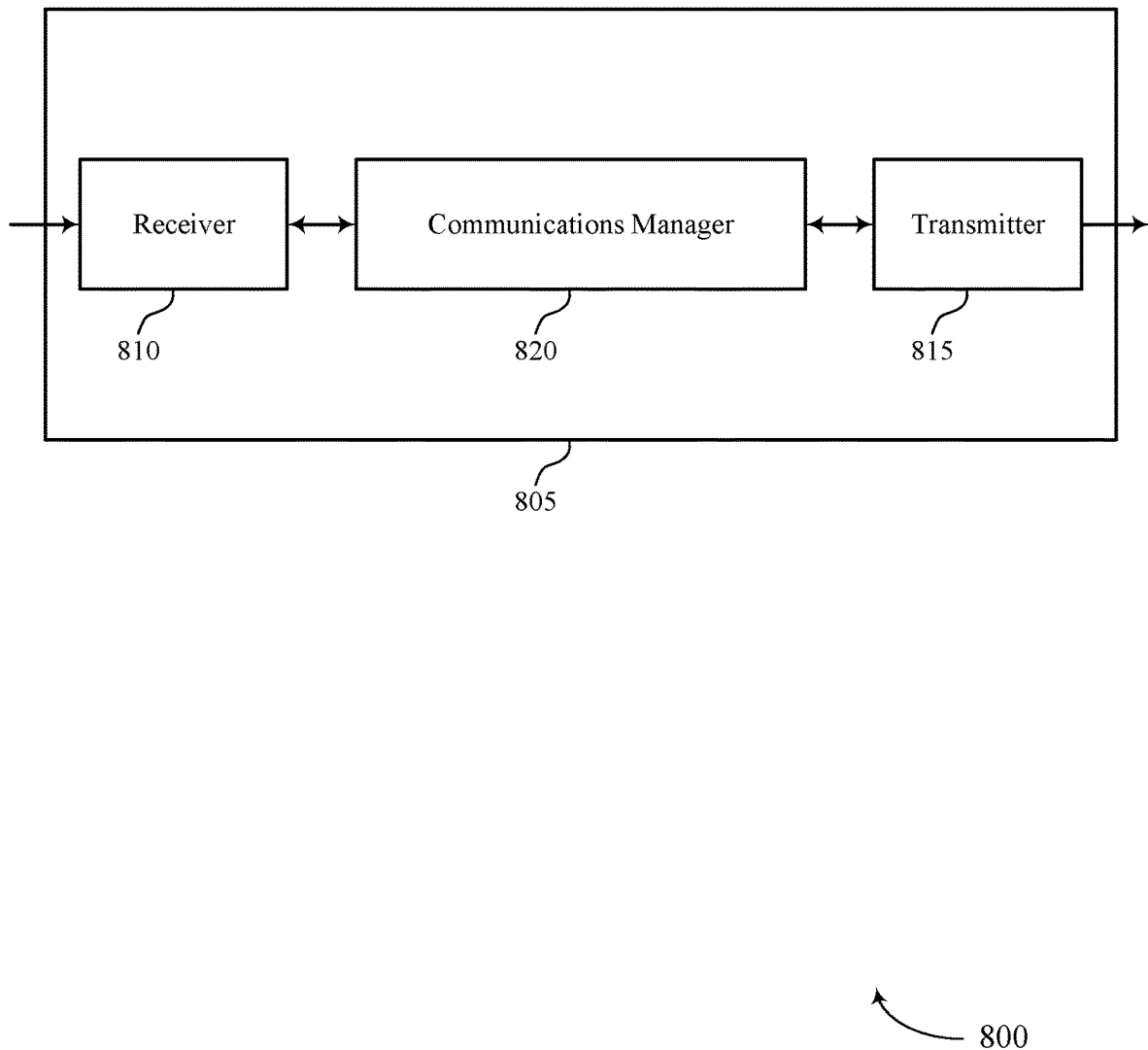
FIGS. 8 and 9 show block diagrams of devices that support iterative wake up signaling for power saving in accordance with one or more aspects of the present disclosure.

FIG. 8 shows a block diagram 800 of a device 805 that supports iterative wake up signaling for power saving in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of iterative wake up signaling for power saving as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first wireless device in accordance with examples as disclosed herein. For example, the communications manager 820 may be configured as or otherwise support a means for receiving, from a VUE, an iterative wake-up signal, the iterative wake-up signal including location information associated with an expected path of the VUE, where the iterative wake-up signal instructs the first wireless device to transmit one or more other wake-up signals to at least a second wireless device that supports communication along a portion of the expected path of the VUE. The communications manager 820 may be configured as or otherwise support a means for transmitting a wake-up signal to the second wireless device based on the location information associated with the expected path of the VUE.

Additionally, or alternatively, the communications manager 820 may support wireless communications at a second wireless device in accordance with examples as disclosed herein. For example, the communications manager 820 may be configured as or otherwise support a means for receiving, from a first wireless device along an expected path of a VUE, a wake-up signal indicating the second wireless device to activate at least one component of the second wireless device for communication with the VUE based on the second wireless device supporting communication along at least a portion of the expected path of the VUE. The communications manager 820 may be configured as or otherwise support a means for activating one or more components of the second wireless device based on the wake-up signal.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced power consumption by the device 805. In an example, one or more components of the device 805 may be deactivated and in case of an ORAN architecture, one or more of a CU, DU, or RU may be deactivated or enter a low power mode.

Figure 9:
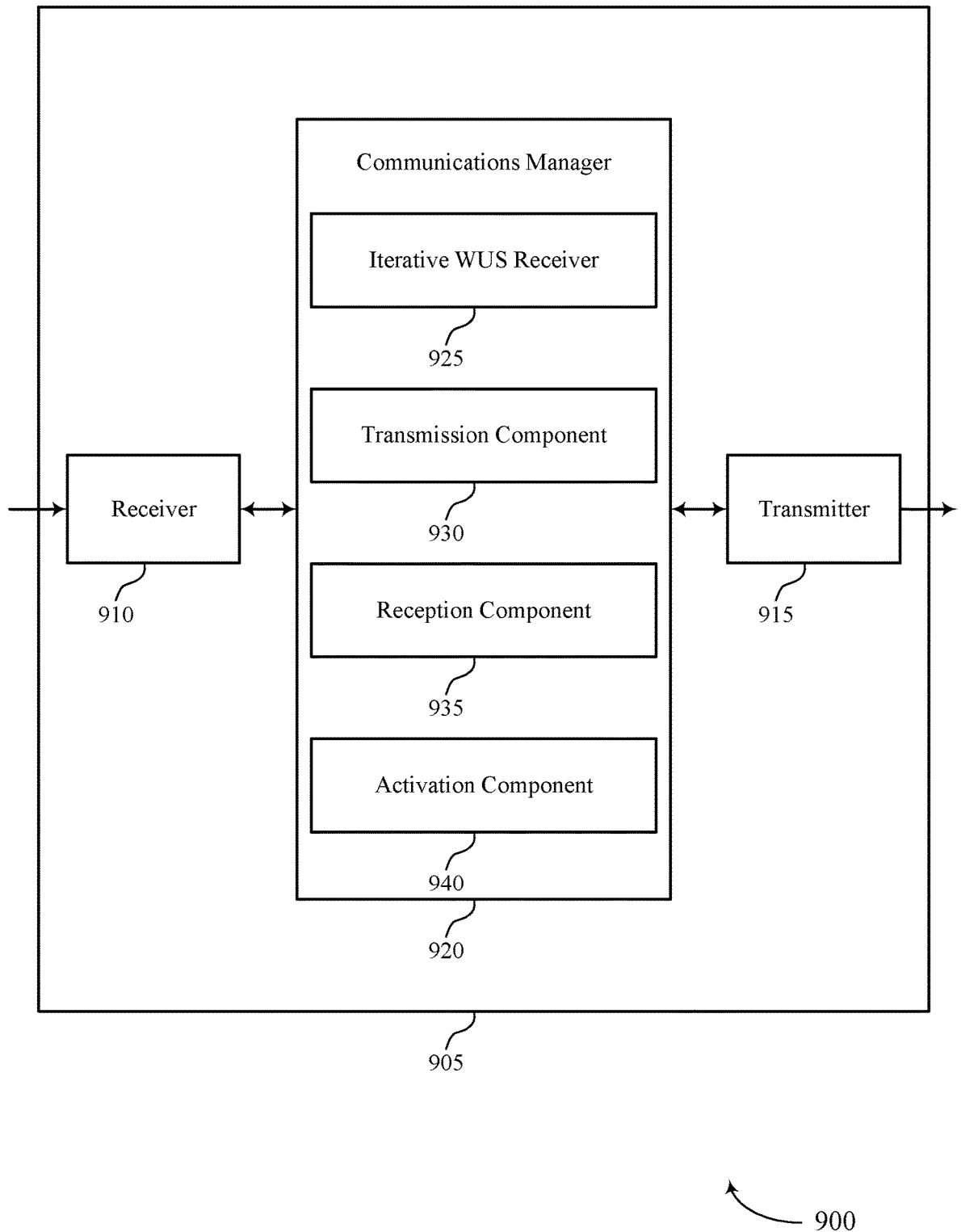

FIG. 9 shows a block diagram 900 of a device 905 that supports iterative wake up signaling for power saving in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of iterative wake up signaling for power saving as described herein. For example, the communications manager 920 may include an iterative WUS receiver 925, a transmission component 930, a reception component 935, an activation component 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first wireless device in accordance with examples as disclosed herein. The iterative WUS receiver 925 may be configured as or otherwise support a means for receiving, from a VUE, an iterative wake-up signal, the iterative wake-up signal including location information associated with an expected path of the VUE, where the iterative wake-up signal instructs the first wireless device to transmit one or more other wake-up signals to at least a second wireless device that supports communication along a portion of the expected path of the VUE. The transmission component 930 may be configured as or otherwise support a means for transmitting a wake-up signal to the second wireless device based on the location information associated with the expected path of the VUE.

Additionally, or alternatively, the communications manager 920 may support wireless communications at a second wireless device in accordance with examples as disclosed herein. The reception component 935 may be configured as or otherwise support a means for receiving, from a first wireless device along an expected path of a VUE, a wake-up signal indicating the second wireless device to activate at least one component of the second wireless device for communication with the VUE based on the second wireless device supporting communication along at least a portion of the expected path of the VUE. The activation component 940 may be configured as or otherwise support a means for activating one or more components of the second wireless device based on the wake-up signal.

Figure 10:
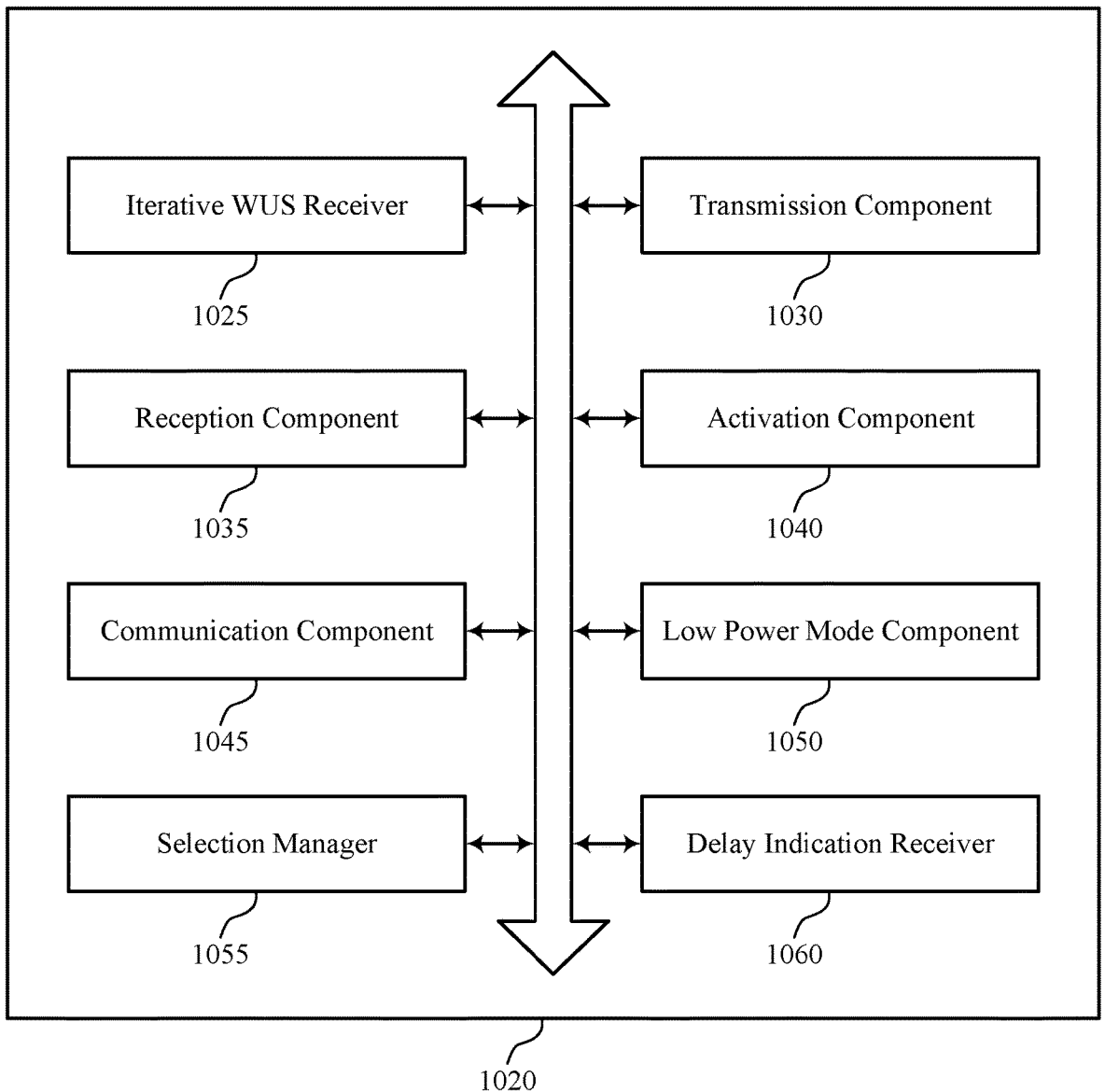
FIG. 10 shows a block diagram of a communications manager that supports iterative wake up signaling for power saving in accordance with one or more aspects of the present disclosure.

FIG. 10 shows a block diagram 1000 of a communications manager 1020 that supports iterative wake up signaling for power saving in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of iterative wake up signaling for power saving as described herein. For example, the communications manager 1020 may include an iterative WUS receiver 1025, a transmission component 1030, a reception component 1035, an activation component 1040, a communication component 1045, a low power mode component 1050, a selection manager 1055, a delay indication receiver 1060, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications at a first wireless device in accordance with examples as disclosed herein. The iterative WUS receiver 1025 may be configured as or otherwise support a means for receiving, from a VUE, an iterative wake-up signal, the iterative wake-up signal including location information associated with an expected path of the VUE, where the iterative wake-up signal instructs the first wireless device to transmit one or more other wake-up signals to at least a second wireless device that supports communication along a portion of the expected path of the VUE. The transmission component 1030 may be configured as or otherwise support a means for transmitting a wake-up signal to the second wireless device based on the location information associated with the expected path of the VUE.

In some examples, to support transmitting the wake-up signal, the transmission component 1030 may be configured as or otherwise support a means for transmitting a second iterative wake-up signal including the location information associated with the expected path of the VUE, the iterative wake-up signal instructing the second wireless device to transmit one or more additional wake-up signals to at least a third wireless device that supports communication along the portion of the expected path of the VUE.

In some examples, the selection manager 1055 may be configured as or otherwise support a means for selecting a sequence from a set of sequences available for the iterative wake-up signal, where the iterative wake-up signal includes the sequence.

In some examples, to support transmitting the wake-up signal, the transmission component 1030 may be configured as or otherwise support a means for transmitting the wake-up signal to the second wireless device, the wake-up signal indicating the second wireless device to activate one or more components for communication with the VUE.

In some examples, to support transmitting the wake-up signal, the transmission component 1030 may be configured as or otherwise support a means for transmitting the wake-up signal indicating the second wireless device to activate communication components, sensor components, or a combination thereof after a delay.

In some examples, to support transmitting the wake-up signal, the transmission component 1030 may be configured as or otherwise support a means for transmitting an indication of the delay in the wake-up signal.

In some examples, to support transmitting the wake-up signal, the transmission component 1030 may be configured as or otherwise support a means for transmitting, within the wake-up signal, a source identifier associated with the VUE.

In some examples, the activation component 1040 may be configured as or otherwise support a means for activating one or more components of the first wireless device based on the iterative wake-up signal. In some examples, the communication component 1045 may be configured as or otherwise support a means for communicating with the VUE using the one or more components after activating the one or more components.

In some examples, the one or more components are activated after a delay.

In some examples, the low power mode component 1050 may be configured as or otherwise support a means for activating a low power mode for one or more components of the first wireless device based on the VUE leaving a service area associated with the first wireless device.

In some examples, the low power mode component 1050 may be configured as or otherwise support a means for activating the low power mode for a sensor system of the first wireless device after a first delay based on the VUE leaving a first portion of the service area associated with the first wireless device. In some examples, the low power mode component 1050 may be configured as or otherwise support a means for activating the low power mode for a communication system of the first wireless device after a second delay based on the VUE leaving a second portion of the service area associated with the first wireless device.

In some examples, the reception component 1035 may be configured as or otherwise support a means for receiving, from the VUE, positioning information associated with the VUE. In some examples, the low power mode component 1050 may be configured as or otherwise support a means for activating a low power mode for one or more components of the first wireless device based on the positioning information with the VUE and the location information of the VUE.

Additionally, or alternatively, the communications manager 1020 may support wireless communications at a second wireless device in accordance with examples as disclosed herein. The reception component 1035 may be configured as or otherwise support a means for receiving, from a first wireless device along an expected path of a VUE, a wake-up signal indicating the second wireless device to activate at least one component for communication with the VUE based on the second wireless device supporting communication along at least a portion of the expected path of the VUE. The activation component 1040 may be configured as or otherwise support a means for activating one or more components of the second wireless device based on the wake-up signal.

In some examples, to support activating the one or more components of the second wireless device, the activation component 1040 may be configured as or otherwise support a means for activating both a communication system and a sensor system of the second wireless device after a delay.

In some examples, the delay indication receiver 1060 may be configured as or otherwise support a means for receiving an indication of the delay from the first wireless device.

In some examples, to support activating the one or more components of the second wireless device, the activation component 1040 may be configured as or otherwise support a means for activating a communication system of the second wireless device after a first delay based on the wake-up signal. In some examples, to support activating the one or more components of the second wireless device, the activation component 1040 may be configured as or otherwise support a means for activating a sensor system of the second wireless device after a second delay, where the second delay is different than the first delay.

In some examples, the transmission component 1030 may be configured as or otherwise support a means for transmitting a second wake-up signal to a third wireless device, the second wake-up signal indicating the third wireless device to activate at least one component of the third wireless device for communication with the VUE, the third wireless device supporting communication along at least a second portion of the expected path of the VUE.

In some examples, to support transmitting the second wake-up signal, the transmission component 1030 may be configured as or otherwise support a means for transmitting location information associated with the VUE to the third wireless device.

In some examples, to support transmitting the second wake-up signal, the transmission component 1030 may be configured as or otherwise support a means for transmitting a non-iterative wake-up signal to the third wireless device.

Figure 11:
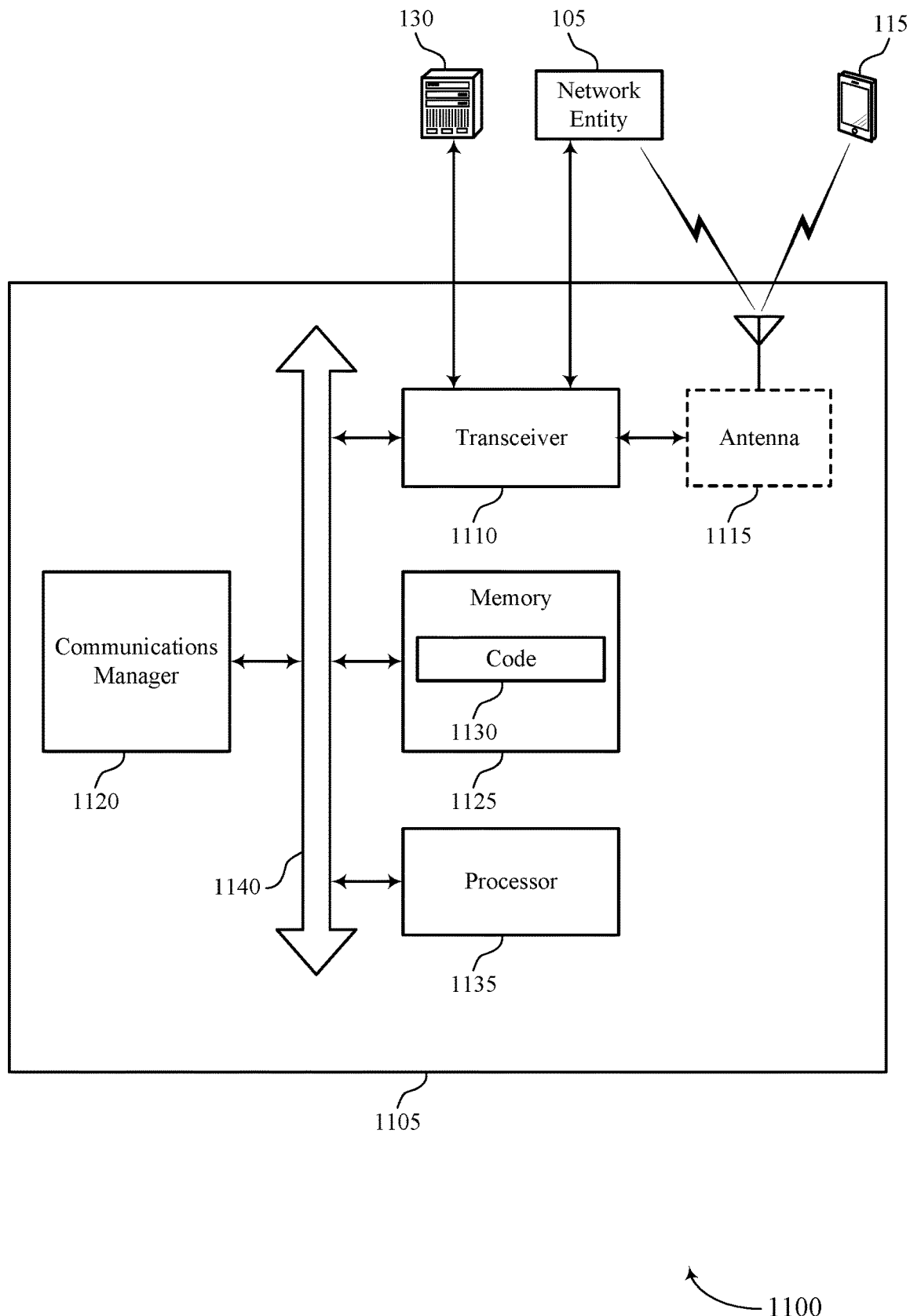
FIG. 11 shows a diagram of a system including a device that supports iterative wake up signaling for power saving in accordance with one or more aspects of the present disclosure.

FIG. 11 shows a diagram of a system 1100 including a device 1105 that supports iterative wake up signaling for power saving in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting iterative wake up signaling for power saving). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a first wireless device in accordance with examples as disclosed herein. For example, the communications manager 1120 may be configured as or otherwise support a means for receiving, from a VUE, an iterative wake-up signal, the iterative wake-up signal including location information associated with an expected path of the VUE, where the iterative wake-up signal instructs the first wireless device to transmit one or more other wake-up signals to at least a second wireless device that supports communication along a portion of the expected path of the VUE. The communications manager 1120 may be configured as or otherwise support a means for transmitting a wake-up signal to the second wireless device based on the location information associated with the expected path of the VUE.

Additionally, or alternatively, the communications manager 1120 may support wireless communications at a second wireless device in accordance with examples as disclosed herein. For example, the communications manager 1120 may be configured as or otherwise support a means for receiving, from a first wireless device along an expected path of a VUE, a wake-up signal indicating the second wireless device to activate at least one component for communication with the VUE based on the second wireless device supporting communication along at least a portion of the expected path of the VUE. The communications manager 1120 may be configured as or otherwise support a means for activating one or more components of the second wireless device based on the wake-up signal.

By including or configuring the communications manager 1120 in accordance with examples as described herein, the device 1105 may support techniques for improved power savings and communications with other wireless devices, such as UEs. Such techniques may enable efficient communication of information (e.g., safety information) and power savings by waking up the device 1105 for communication of the information and the device 1105 entering a low power mode after communicating the information.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of iterative wake up signaling for power saving as described herein, or the processor 1135 and the memory 1125 may be otherwise configured to perform or support such operations.

Figure 12:
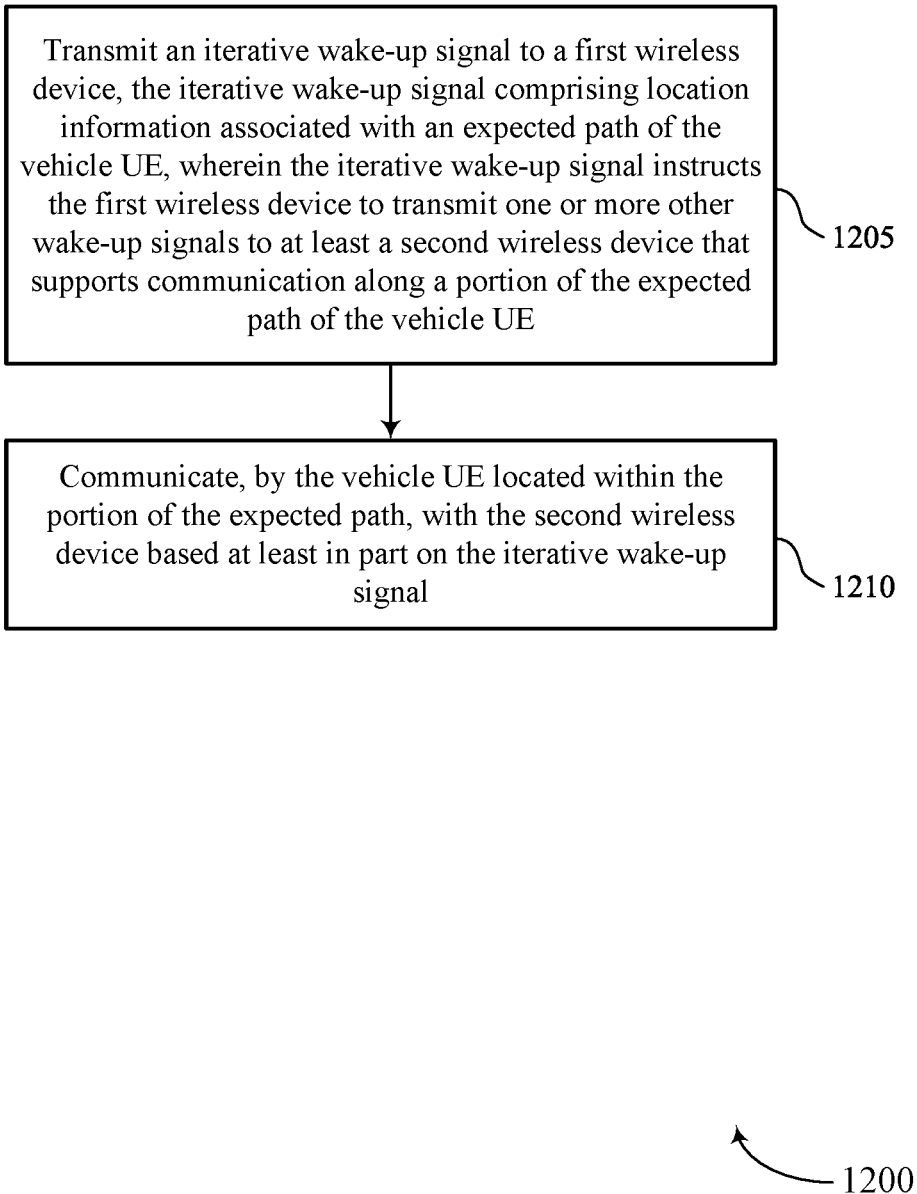
FIGS. 12 through 15 show flowcharts illustrating methods that support iterative wake up signaling for power saving in accordance with one or more aspects of the present disclosure.

FIG. 12 shows a flowchart illustrating a method 1200 that supports iterative wake up signaling for power saving in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include transmitting an iterative wake-up signal to a first wireless device, the iterative wake-up signal including location information associated with an expected path of the VUE, where the iterative wake-up signal instructs the first wireless device to transmit one or more other wake-up signals to at least a second wireless device that supports communication along a portion of the expected path of the VUE. The operations of 1205 may be performed in accordance with examples as disclosed herein. In some examples, aspects of the operations of 1205 may be performed by an iterative WUS transmitter 625 as described with reference to FIG. 6.

At 1210, the method may include communicating, by the VUE located within the portion of the expected path, with the second wireless device based on the iterative wake-up signal. The operations of 1210 may be performed in accordance with examples as disclosed herein. In some examples, aspects of the operations of 1210 may be performed by a communication component 630 as described with reference to FIG. 6.

Figure 13:
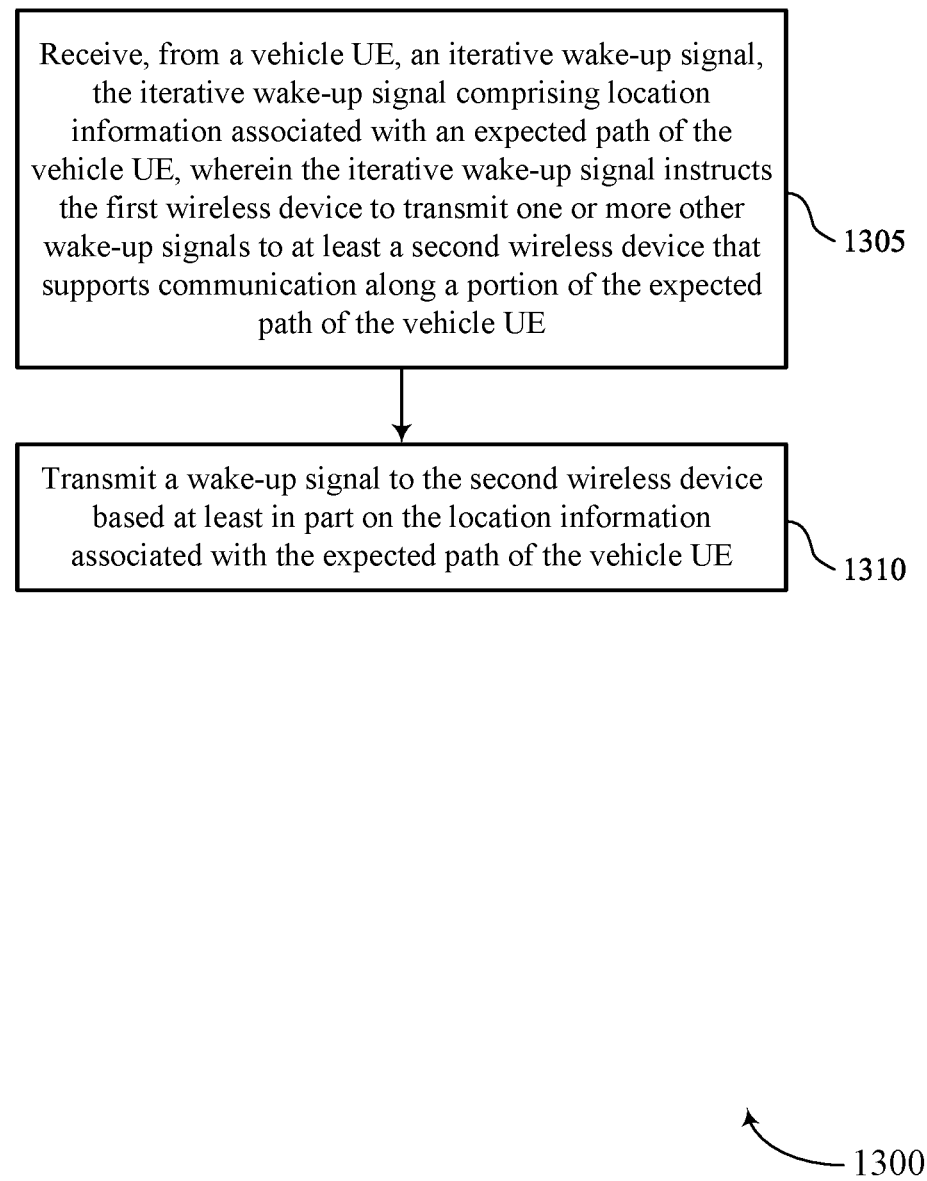

FIG. 13 shows a flowchart illustrating a method 1300 that supports iterative wake up signaling for power saving in accordance with one or more aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include receiving, from a VUE, an iterative wake-up signal, the iterative wake-up signal including location information associated with an expected path of the VUE, where the iterative wake-up signal instructs the first wireless device to transmit one or more other wake-up signals to at least a second wireless device that supports communication along a portion of the expected path of the VUE. The operations of 1305 may be performed in accordance with examples as disclosed herein. In some examples, aspects of the operations of 1305 may be performed by an iterative WUS receiver 1025 as described with reference to FIG. 10.

At 1310, the method may include transmitting a wake-up signal to the second wireless device based on the location information associated with the expected path of the VUE. The operations of 1310 may be performed in accordance with examples as disclosed herein. In some examples, aspects of the operations of 1310 may be performed by a transmission component 1030 as described with reference to FIG. 10.

Figure 14:
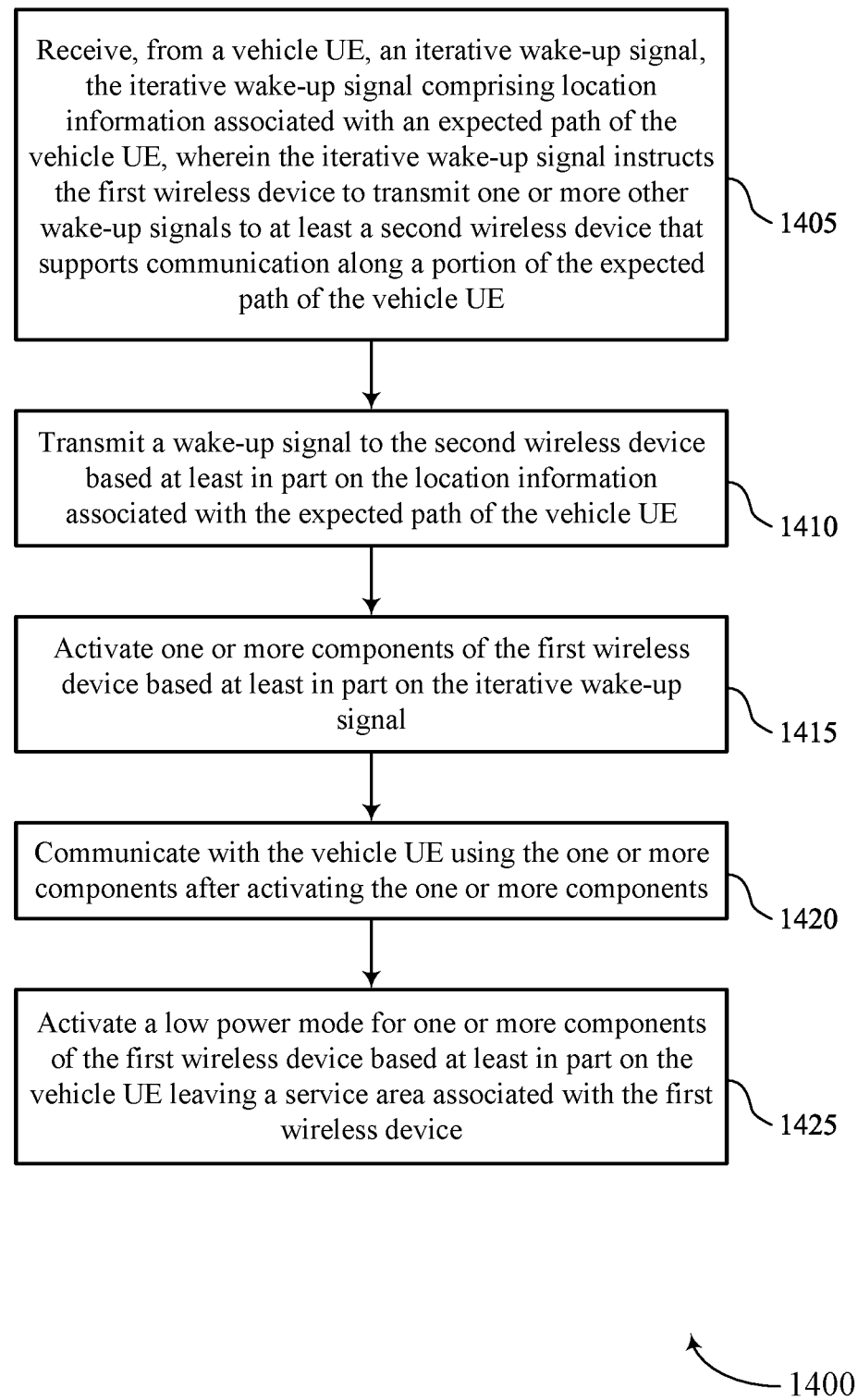

FIG. 14 shows a flowchart illustrating a method 1400 that supports iterative wake up signaling for power saving in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include receiving, from a VUE, an iterative wake-up signal, the iterative wake-up signal including location information associated with an expected path of the VUE, where the iterative wake-up signal instructs the first wireless device to transmit one or more other wake-up signals to at least a second wireless device that supports communication along a portion of the expected path of the VUE. The operations of 1405 may be performed in accordance with examples as disclosed herein. In some examples, aspects of the operations of 1405 may be performed by an iterative WUS receiver 1025 as described with reference to FIG. 10.

At 1410, the method may include transmitting a wake-up signal to the second wireless device based on the location information associated with the expected path of the VUE. The operations of 1410 may be performed in accordance with examples as disclosed herein. In some examples, aspects of the operations of 1410 may be performed by a transmission component 1030 as described with reference to FIG. 10.

At 1415, the method may include activating one or more components of the first wireless device based on the iterative wake-up signal. The operations of 1415 may be performed in accordance with examples as disclosed herein. In some examples, aspects of the operations of 1415 may be performed by an activation component 1040 as described with reference to FIG. 10.

At 1420, the method may include communicating with the VUE using the one or more components after activating the one or more components. The operations of 1420 may be performed in accordance with examples as disclosed herein. In some examples, aspects of the operations of 1420 may be performed by a communication component 1045 as described with reference to FIG. 10.

At 1425, the method may include activating a low power mode for one or more components of the first wireless device based on the VUE leaving a service area associated with the first wireless device. The operations of 1425 may be performed in accordance with examples as disclosed herein. In some examples, aspects of the operations of 1425 may be performed by a low power mode component 1050 as described with reference to FIG. 10.

Figure 15:
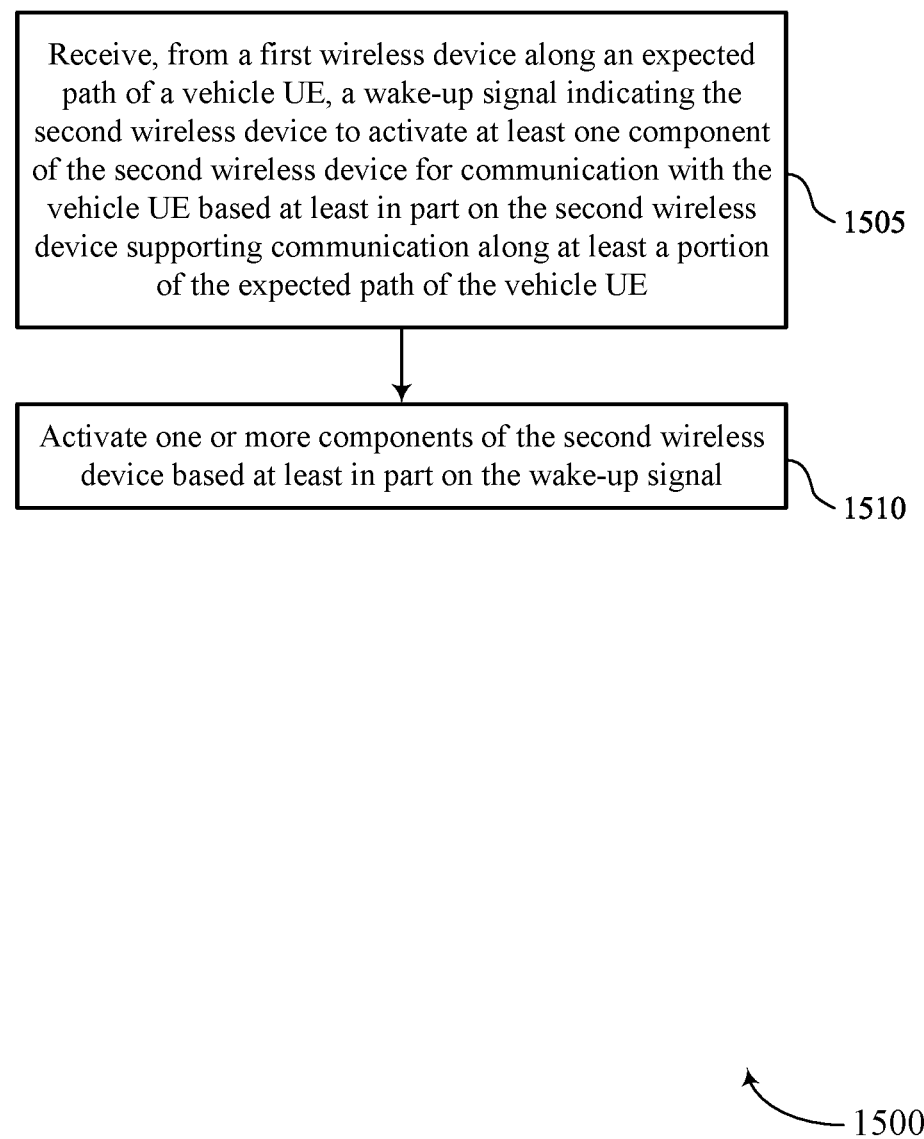

FIG. 15 shows a flowchart illustrating a method 1500 that supports iterative wake up signaling for power saving in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a first wireless device along an expected path of a VUE, a wake-up signal indicating the second wireless device to activate at least one component of the second wireless device for communication with the VUE based on the second wireless device supporting communication along at least a portion of the expected path of the VUE. The operations of 1505 may be performed in accordance with examples as disclosed herein. In some examples, aspects of the operations of 1505 may be performed by a reception component 1035 as described with reference to FIG. 10.

At 1510, the method may include activating one or more components of the second wireless device based on the wake-up signal. The operations of 1510 may be performed in accordance with examples as disclosed herein. In some examples, aspects of the operations of 1510 may be performed by an activation component 1040 as described with reference to FIG. 10.

The following provides an overview of aspects of the present disclosure:

Aspect 1: A method for wireless communications at a vehicle UE, comprising: transmitting an iterative wake-up signal to a first wireless device, the iterative wake-up signal comprising location information associated with an expected path of the vehicle UE, wherein the iterative wake-up signal instructs the first wireless device to transmit one or more other wake-up signals to at least a second wireless device that supports communication along a portion of the expected path of the vehicle UE; and communicating, by the vehicle UE located within the portion of the expected path, with the second wireless device based at least in part on the iterative wake-up signal.

Aspect 2: The method of aspect 1, further comprising: selecting a sequence from a set of sequences available for the iterative wake-up signal, wherein the iterative wake-up signal comprises the sequence.

Aspect 3: The method of any of aspects 1 through 2, wherein transmitting the iterative wake-up signal comprises: transmitting, within the iterative wake-up signal, a field comprising one or more bits indicating that the iterative wake-up signal is iterative.

Aspect 4: The method of any of aspects 1 through 3, wherein transmitting the iterative wake-up signal comprises: transmitting, within the iterative wake-up signal, a source identifier associated with the vehicle UE.

Aspect 5: The method of any of aspects 1 through 4, further comprising: transmitting, to the first wireless device, a message comprising a source identifier associated with the vehicle UE.

Aspect 6: The method of aspect 5, wherein transmitting the message comprises: transmitting a sidelink control information message that comprises the source identifier associated with the vehicle UE.

Aspect 7: The method of any of aspects 1 through 6, further comprising: transmitting, to the first wireless device, positioning information of the vehicle UE, the positioning information comprising a speed of the vehicle UE, a direction of the vehicle UE, or both.

Aspect 8: The method of any of aspects 1 through 7, wherein the location information comprises one or more waypoints associated with the expected path of the vehicle UE, a map associated with the expected path of the vehicle UE, source location information associated with the vehicle UE, destination location information associated with the vehicle UE, or any combination thereof.

Aspect 9: A method for wireless communications at a first wireless device, comprising: receiving, from a vehicle UE, an iterative wake-up signal, the iterative wake-up signal comprising location information associated with an expected path of the vehicle UE, wherein the iterative wake-up signal instructs the first wireless device to transmit one or more other wake-up signals to at least a second wireless device that supports communication along a portion of the expected path of the vehicle UE; and transmitting a wake-up signal to the second wireless device based at least in part on the location information associated with the expected path of the vehicle UE.

Aspect 10: The method of aspect 9, wherein transmitting the wake-up signal comprises: transmitting a second iterative wake-up signal comprising the location information associated with the expected path of the vehicle UE, the iterative wake-up signal instructing the second wireless device to transmit one or more additional wake-up signals to at least a third wireless device that supports communication along the portion of the expected path of the vehicle UE.

Aspect 11: The method of aspect 10, further comprising: selecting a sequence from a set of sequences available for the iterative wake-up signal, wherein the iterative wake-up signal comprises the sequence.

Aspect 12: The method of any of aspects 9 through 11, wherein transmitting the wake-up signal comprises: transmitting the wake-up signal to the second wireless device, the wake-up signal indicating the second wireless device to activate one or more components for communication with the vehicle UE.

Aspect 13: The method of any of aspects 9 through 12, wherein transmitting the wake-up signal comprises: transmitting the wake-up signal indicating the second wireless device to activate communication components, sensor components, or a combination thereof after a delay.

Aspect 14: The method of aspect 13, wherein transmitting the wake-up signal comprises: transmitting an indication of the delay in the wake-up signal.

Aspect 15: The method of any of aspects 9 through 14, wherein transmitting the wake-up signal comprises: transmitting, within the wake-up signal, a source identifier associated with the vehicle UE.

Aspect 16: The method of any of aspects 9 through 15, further comprising: activating one or more components of the first wireless device based at least in part on the iterative wake-up signal; and communicating with the vehicle UE using the one or more components after activating the one or more components.

Aspect 17: The method of aspect 16, wherein the one or more components are activated after a delay.

Aspect 18: The method of any of aspects 9 through 17, further comprising: activating a low power mode for one or more components of the first wireless device based at least in part on the vehicle UE leaving a service area associated with the first wireless device.

Aspect 19: The method of aspect 18, further comprising: activating the low power mode for a sensor system of the first wireless device after a first delay based at least in part on the vehicle UE leaving a first portion of the service area associated with the first wireless device; and activating the low power mode for a communication system of the first wireless device after a second delay based at least in part on the vehicle UE leaving a second portion of the service area associated with the first wireless device.

Aspect 20: The method of any of aspects 9 through 19, further comprising: receiving, from the vehicle UE, positioning information associated with the vehicle UE; and activating a low power mode for one or more components of the first wireless device based at least in part on the positioning information with the vehicle UE and the location information of the vehicle UE.

Aspect 21: A method for wireless communications at a second wireless device, comprising: receiving, from a first wireless device along an expected path of a vehicle UE, a wake-up signal indicating the second wireless device to activate at least one component of the second wireless device for communication with the vehicle UE based at least in part on the second wireless device supporting communication along at least a portion of the expected path of the vehicle UE; and activating one or more components of the second wireless device based at least in part on the wake-up signal.

Aspect 22: The method of aspect 21, wherein activating the one or more components of the second wireless device comprises: activating both a communication system and a sensor system of the second wireless device after a delay.

Aspect 23: The method of aspect 22, further comprising: receiving an indication of the delay from the first wireless device.

Aspect 24: The method of any of aspects 21 through 23, wherein activating the one or more components of the second wireless device comprises: activating a communication system of the second wireless device after a first delay based at least in part on the wake-up signal; and activating a sensor system of the second wireless device after a second delay, wherein the second delay is different than the first delay.

Aspect 25: The method of any of aspects 21 through 24, further comprising: transmitting a second wake-up signal to a third wireless device, the second wake-up signal indicating the third wireless device to activate at least one component of the third wireless device for communication with the vehicle UE, the third wireless device supporting communication along at least a second portion of the expected path of the vehicle UE.

Aspect 26: The method of aspect 25, wherein transmitting the second wake-up signal comprises: transmitting location information associated with the vehicle UE to the third wireless device.

Aspect 27: The method of any of aspects 25 through 26, wherein transmitting the second wake-up signal comprises: transmitting a non-iterative wake-up signal to the third wireless device.

Aspect 28: An apparatus for wireless communications at a vehicle UE, comprising a processor; memory coupled with the processor; and one or more instructions stored in the memory and executable by the processor to cause the apparatus to perform, based at least in part on the one or more instructions a method of any of aspects 1 through 8.

Aspect 29: An apparatus for wireless communications at a vehicle UE, comprising at least one means for performing a method of any of aspects 1 through 8.

Aspect 30: A non-transitory computer-readable medium storing code for wireless communications at a vehicle UE, the code comprising instructions executable by a processor to perform a method of any of aspects 1 through 8.

Aspect 31: An apparatus for wireless communications at a first wireless device, comprising a processor; memory coupled with the processor; and instructions stored in the memory and executable by the processor to cause the apparatus to perform a method of any of aspects 9 through 20.

Aspect 32: An apparatus for wireless communications at a first wireless device, comprising at least one means for performing a method of any of aspects 9 through 20.

Aspect 33: A non-transitory computer-readable medium storing code for wireless communications at a first wireless device, the code comprising instructions executable by a processor to perform a method of any of aspects 9 through 20.

Aspect 34: An apparatus for wireless communications at a second wireless device, comprising a processor; memory coupled with the processor; and one or more instructions stored in the memory and executable by the processor to cause the apparatus to, based at least in part on the one or more instructions, perform a method of any of aspects 21 through 27.

Aspect 35: An apparatus for wireless communications at a second wireless device, comprising at least one means for performing a method of any of aspects 21 through 27.

Aspect 36: A non-transitory computer-readable medium storing code for wireless communications at a second wireless device, the code comprising instructions executable by a processor to perform a method of any of aspects 21 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a vehicle user equipment (UE), comprising:

transmitting an iterative wake-up signal to a first wireless device, the iterative wake-up signal comprising location information associated with an expected path of the vehicle UE, wherein the iterative wake-up signal instructs the first wireless device to transmit one or more other wake-up signals to at least a second wireless device that supports communication along a portion of the expected path of the vehicle UE; and communicating, by the vehicle UE located within the portion of the expected path, with the second wireless device based at least in part on the iterative wake-up signal.

2. The method of claim 1, further comprising:
selecting a sequence from a set of sequences available for the iterative wake-up signal, wherein the iterative wake-up signal comprises the sequence.

3. The method of claim 1, wherein transmitting the iterative wake-up signal comprises:
transmitting, within the iterative wake-up signal, a field comprising one or more bits indicating that the iterative wake-up signal is iterative.

4. The method of claim 1, wherein transmitting the iterative wake-up signal comprises:
transmitting, within the iterative wake-up signal, a source identifier associated with the vehicle UE.

5. The method of claim 1, further comprising:
transmitting, to the first wireless device, a message comprising a source identifier associated with the vehicle UE.

6. The method of claim 5, wherein transmitting the message comprises:
transmitting a sidelink control information message that comprises the source identifier associated with the vehicle UE.

7. The method of claim 1, further comprising:
transmitting, to the first wireless device, positioning information of the vehicle UE, the positioning information comprising a speed of the vehicle UE, a direction of the vehicle UE, or both.

8. The method of claim 1, wherein the location information comprises one or more waypoints associated with the expected path of the vehicle UE, a map associated with the expected path of the vehicle UE, source location information associated with the vehicle UE, destination location information associated with the vehicle UE, or any combination thereof.

9. An apparatus for wireless communications at a vehicle user equipment (UE), comprising:
one or more processors;
one or more memories coupled with the one or more processors; and
one or more instructions stored in the one or more memories and executable by the one or more processors to cause the apparatus to, based at least in part on the one or more instructions:
transmit an iterative wake-up signal to a first wireless device, the iterative wake-up signal comprising location information associated with an expected path of the vehicle UE, wherein the iterative wake-up signal instructs the first wireless device to transmit one or more other wake-up signals to at least a second wireless device that supports communication along a portion of the expected path of the vehicle UE; and
communicate, by the vehicle UE located within the portion of the expected path, with the second wireless device based at least in part on the iterative wake-up signal.

10. The apparatus of claim 9, wherein the one or more instructions are further executable by the one or more processors to cause the apparatus to:
select a sequence from a set of sequences available for the iterative wake-up signal, wherein the iterative wake-up signal comprises the sequence.

11. The apparatus of claim 9, wherein the one or more instructions to transmit the iterative wake-up signal are executable by the one or more processors to cause the apparatus to:
transmit, within the iterative wake-up signal, a field comprising one or more bits indicating that the iterative wake-up signal is iterative.

12. The apparatus of claim 9, wherein transmitting the iterative wake-up signal comprises:
transmitting, within the iterative wake-up signal, a source identifier associated with the vehicle UE.

13. The apparatus of claim 9, wherein the one or more instructions are further executable by the one or more processors to cause the apparatus to:
transmitting, to the first wireless device, a message comprising a source identifier associated with the vehicle UE.

14. The apparatus of claim 13, wherein transmitting the message comprises:
transmitting a sidelink control information message that comprises the source identifier associated with the vehicle UE.

15. The apparatus of claim 9, wherein the one or more instructions are further executable by the one or more processors to cause the apparatus to:
transmitting, to the first wireless device, positioning information of the vehicle UE, the positioning information comprising a speed of the vehicle UE, a direction of the vehicle UE, or both.

16. The apparatus of claim 9, wherein the location information comprises one or more waypoints associated with the expected path of the vehicle UE, a map associated with the expected path of the vehicle UE, source location information associated with the vehicle UE, destination location information associated with the vehicle UE, or any combination thereof.

17. A vehicle user equipment (UE) for wireless communications, comprising:
means for transmitting an iterative wake-up signal to a first wireless device, the iterative wake-up signal comprising location information associated with an expected path of the vehicle UE, wherein the iterative wake-up signal instructs the first wireless device to transmit one or more other wake-up signals to at least a second wireless device that supports communication along a portion of the expected path of the vehicle UE; and
means for communicating, by the vehicle UE located within the portion of the expected path, with the second wireless device based at least in part on the iterative wake-up signal.

18. The vehicle UE of claim 17, further comprising:
means for selecting a sequence from a set of sequences available for the iterative wake-up signal, wherein the iterative wake-up signal comprises the sequence.

19. The vehicle UE of claim 17, wherein the means for transmitting the iterative wake-up signal comprise:
means for transmitting, within the iterative wake-up signal, a field comprising one or more bits indicating that the iterative wake-up signal is iterative.

20. The vehicle UE of claim 17, wherein the means for transmitting the iterative wake-up signal comprise:
means for transmitting, within the iterative wake-up signal, a source identifier associated with the vehicle UE.

21. The vehicle UE of claim 17, further comprising:
means for transmitting, to the first wireless device, a message comprising a source identifier associated with the vehicle UE.

22. The vehicle UE of claim 21, wherein the means for transmitting the message comprise:

means for transmitting a sidelink control information message that comprises the source identifier associated with the vehicle UE.

23. The vehicle UE of claim 17, further comprising:
means for transmitting, to the first wireless device, positioning information of the vehicle UE, the positioning information comprising a speed of the vehicle UE, a direction of the vehicle UE, or both.

24. The vehicle UE of claim 17, wherein the location information comprises one or more waypoints associated with the expected path of the vehicle UE, a map associated with the expected path of the vehicle UE, source location information associated with the vehicle UE, destination location information associated with the vehicle UE, or any combination thereof.

25. A non-transitory computer-readable medium storing code for wireless communications, the code comprising instructions executable by one or more processors to:
transmit an iterative wake-up signal to a first wireless device, the iterative wake-up signal comprising location information associated with an expected path of the vehicle UE, wherein the iterative wake-up signal instructs the first wireless device to transmit one or more other wake-up signals to at least a second wireless device that supports communication along a portion of the expected path of the vehicle UE; and
communicate, by the vehicle UE located within the portion of the expected path, with the second wireless device based at least in part on the iterative wake-up signal.

26. The non-transitory computer-readable medium of claim 25, wherein the instructions are further executable by the one or more processors to:
select a sequence from a set of sequences available for the iterative wake-up signal, wherein the iterative wake-up signal comprises the sequence.

27. The non-transitory computer-readable medium of claim 25, wherein the instructions to transmit the iterative wake-up signal are executable by the one or more processors to:
transmit, within the iterative wake-up signal, a field comprising one or more bits indicating that the iterative wake-up signal is iterative.

28. The non-transitory computer-readable medium of claim 25, wherein the instructions to transmit the iterative wake-up signal are executable by the one or more processors to:
transmit, within the iterative wake-up signal, a source identifier associated with the vehicle UE.

29. The non-transitory computer-readable medium of claim 25, wherein the instructions are further executable by the one or more processors to:
transmit, to the first wireless device, a message comprising a source identifier associated with the vehicle UE.

30. The non-transitory computer-readable medium of claim 29, wherein the instructions to transmit the message are executable by the one or more processors to:
transmit a sidelink control information message that comprises the source identifier associated with the vehicle UE.

* * * * *